(12) United States Patent
Waldron et al.

(10) Patent No.: US 10,265,909 B2
(45) Date of Patent: Apr. 23, 2019

(54) BAG

(71) Applicant: The Glad Products Company, Oakland, CA (US)

(72) Inventors: Matthew W. Waldron, West Chester, OH (US); Shaun T. Broering, Fort Thomas, KY (US); Jason R. Maxwell, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 558 days.

(21) Appl. No.: 14/997,191

(22) Filed: Jan. 15, 2016

(65) Prior Publication Data

US 2016/0129625 A1    May 12, 2016

Related U.S. Application Data

(62) Division of application No. 12/721,414, filed on Mar. 10, 2010, now Pat. No. 9,272,461.

(51) Int. Cl.
| | |
|---|---|
| B29C 53/26 | (2006.01) |
| B29C 53/24 | (2006.01) |
| B29C 55/18 | (2006.01) |
| B65F 1/00 | (2006.01) |
| B65D 33/02 | (2006.01) |
| B65F 1/06 | (2006.01) |
| B29L 31/00 | (2006.01) |
| B29K 101/12 | (2006.01) |
| B29K 105/00 | (2006.01) |

(52) U.S. Cl.
CPC ............ *B29C 53/265* (2013.01); *B29C 53/24* (2013.01); *B29C 55/18* (2013.01); *B65D 33/02* (2013.01); *B65F 1/0006* (2013.01); *B65F 1/06* (2013.01); *B29K 2101/12* (2013.01); *B29K 2105/256* (2013.01); *B29L 2031/7128* (2013.01)

(58) Field of Classification Search
None
See application file for complete search history.

(56) References Cited

U.S. PATENT DOCUMENTS

| | | | |
|---|---|---|---|
| 4,315,963 A * | 2/1982 | Havens | B29C 47/0026 428/35.2 |
| 5,028,289 A | 7/1991 | Rasmussen | |
| 5,205,650 A | 4/1993 | Rasmussen | |
| 5,455,992 A | 10/1995 | Kurschatke et al. | |
| 6,264,872 B1 | 7/2001 | Majors et al. | |
| 6,394,652 B2 | 5/2002 | Meyer et al. | |

(Continued)

*Primary Examiner* — Nathan T Leong
(74) *Attorney, Agent, or Firm* — Thomas C. Feix

(57) ABSTRACT

A thermoplastic bag may include a sidewall that may have a plurality of first and second ribs formed therein. The first ribs may be longer in length but shorter in height than the second ribs. The second ribs may be arranged in discrete networks that appear superimposed over the first ribs. The second ribs may normally remain in a bent-over configuration. When a force is applied, the second ribs may expand the area of the sidewall so that the bag may easily accommodate large objects. To produce the bag, a thermoplastic web may be directed between opposing first and second rollers. One of the rollers may include ridges that may have first and second segments of differing heights that correspond to the differing heights of the first and second ribs. The formation of the first ribs may increase the width of the web.

20 Claims, 28 Drawing Sheets

(56) References Cited

U.S. PATENT DOCUMENTS

| | | | |
|---|---|---|---|
| 2005/0178493 A1* | 8/2005 | Broering | B31B 50/00 156/197 |
| 2006/0093766 A1 | 5/2006 | Savicki et al. | |
| 2006/0151914 A1* | 7/2006 | Gerndt | B29C 55/065 264/288.4 |
| 2009/0003738 A1 | 1/2009 | Hall | |
| 2010/0046860 A1* | 2/2010 | Kent | B65F 1/0006 383/75 |

* cited by examiner

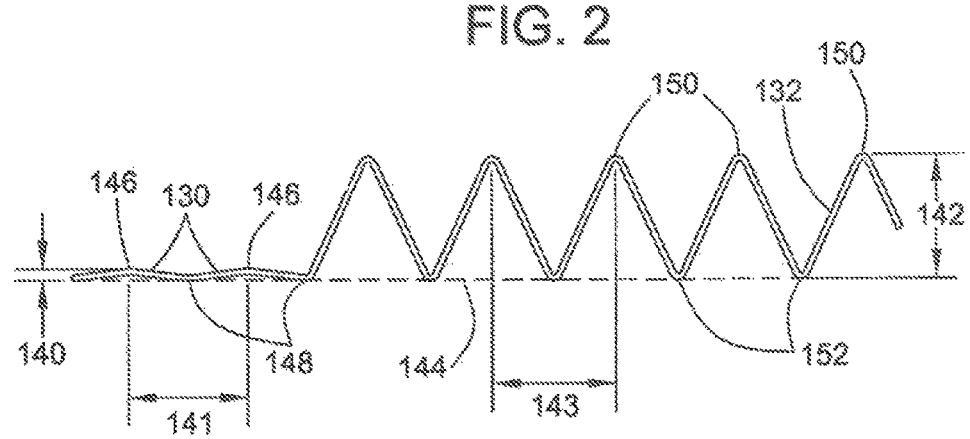
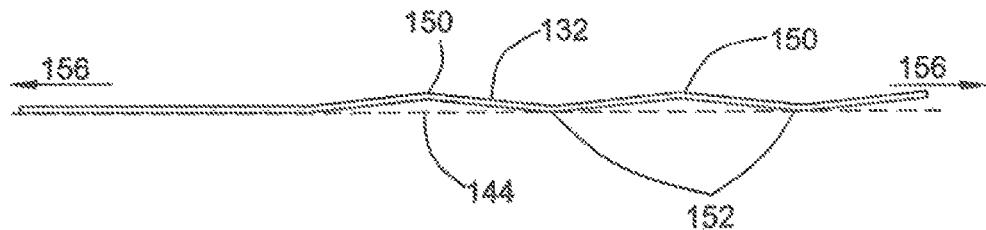

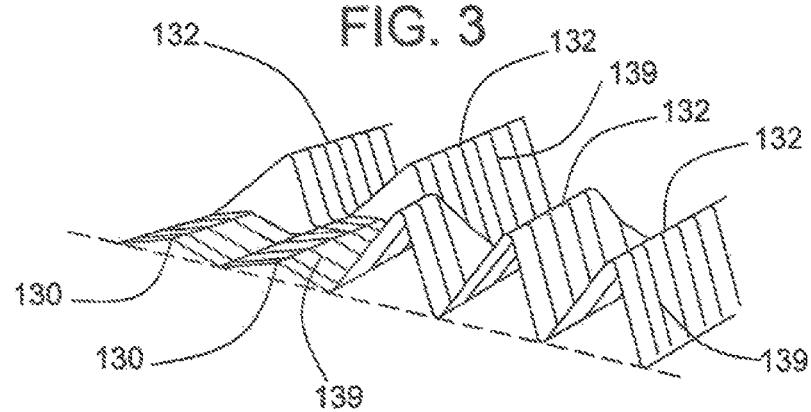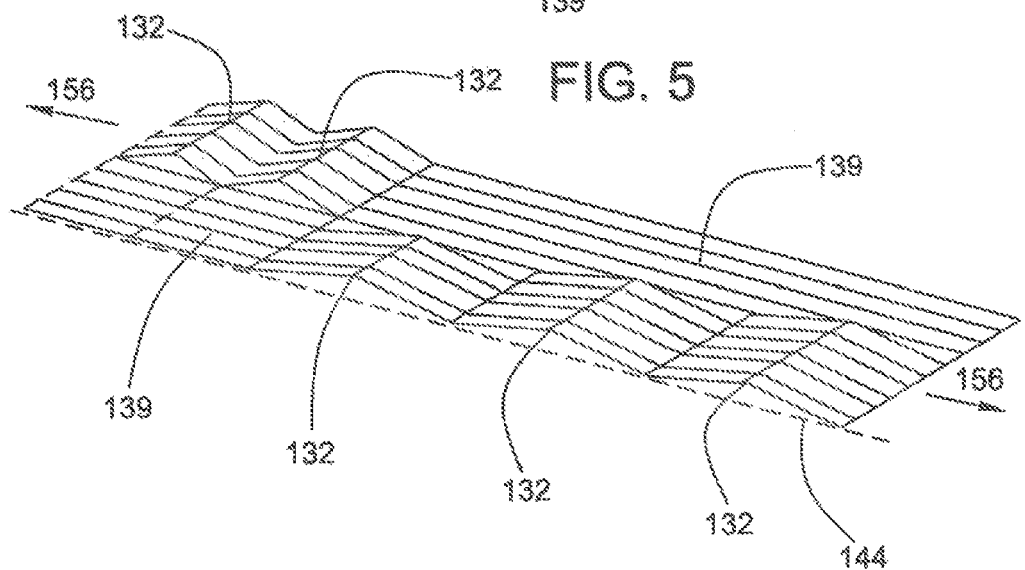

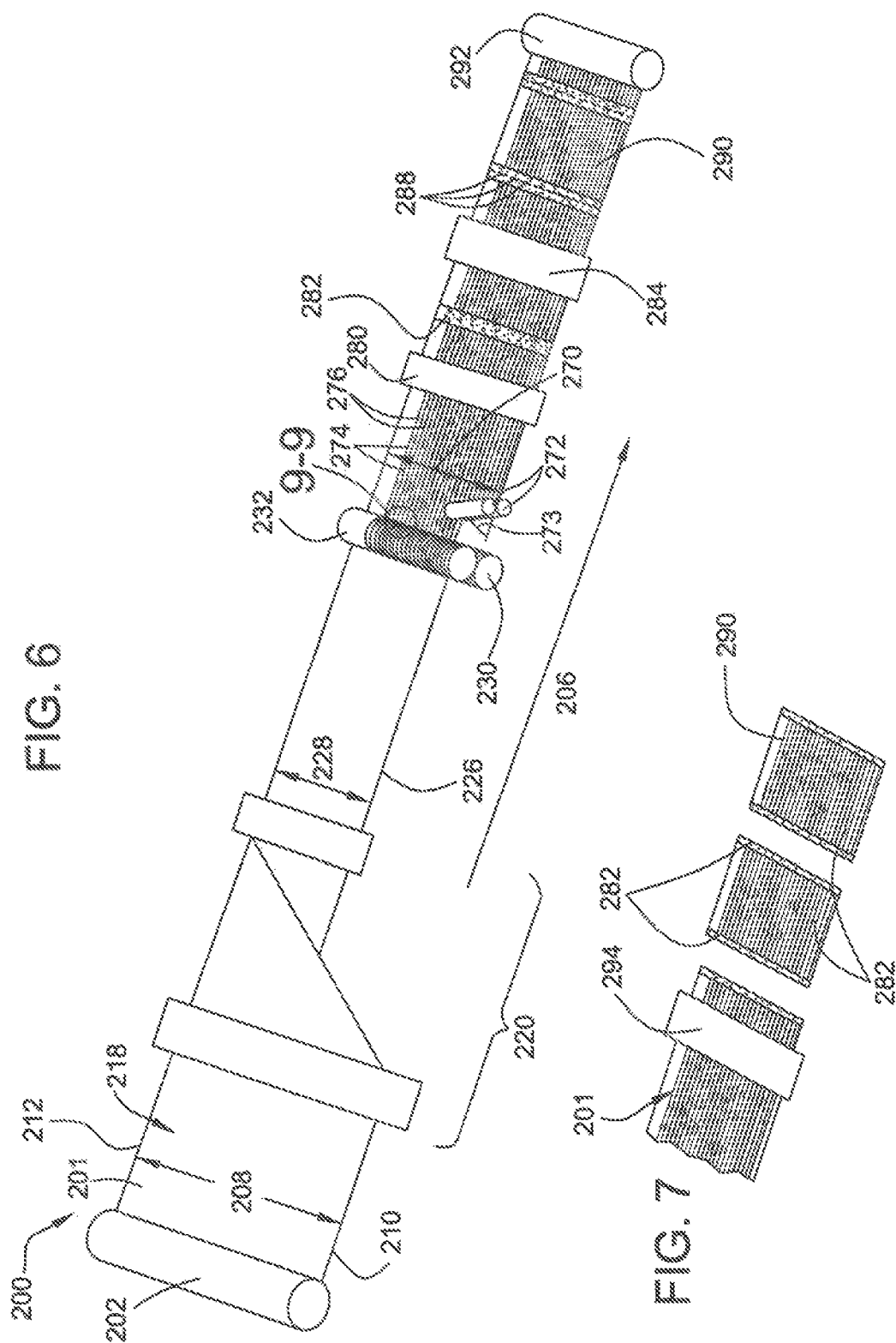

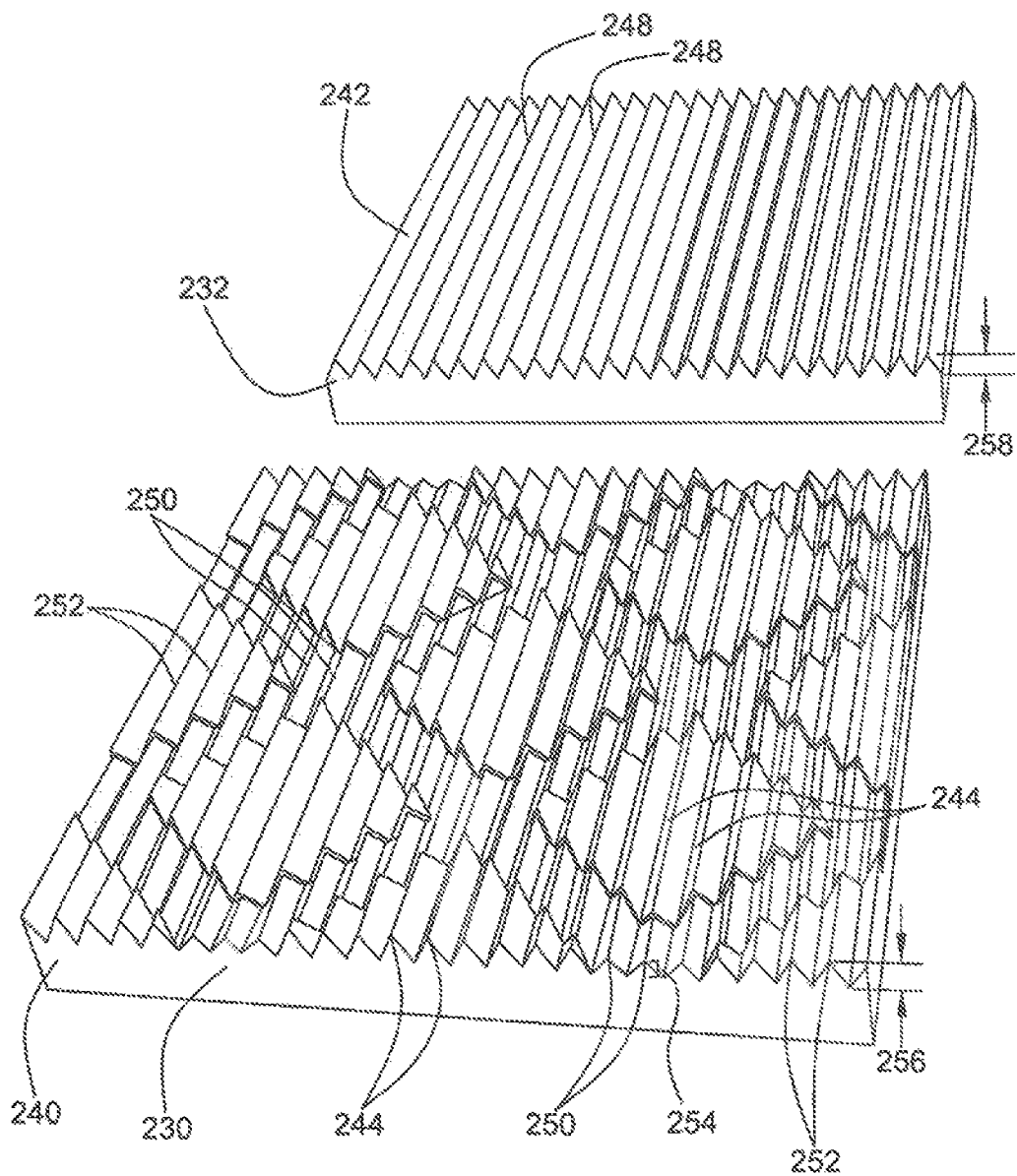

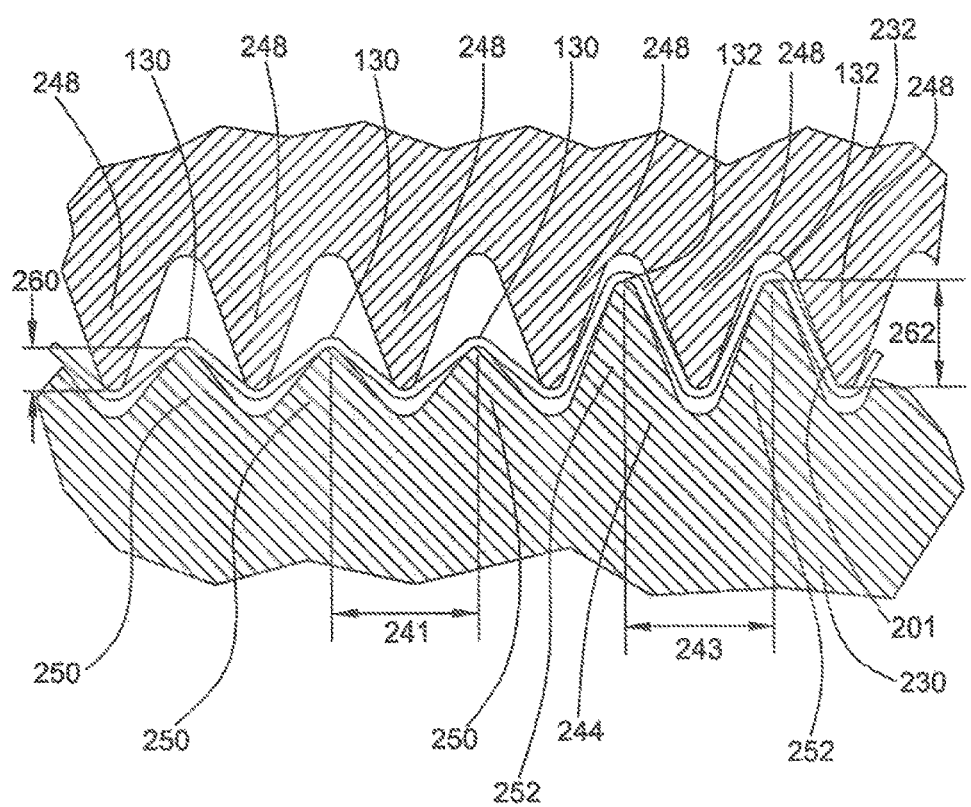

BAG

CROSS-REFERENCE TO RELATED APPLICATIONS

The present application is a division of U.S. patent application Ser. No. 13/228,787 filed Sep. 9, 2011, and entitled BAG, which is a continuation in part of U.S. patent application Ser. No. 12/721,414 filed Mar. 10, 2010 and entitled BAG. Each of the above-referenced applications is hereby incorporated by reference in their entirety.

BACKGROUND

Among their many applications, thermoplastic bags may be used as disposable liners for trash or refuse receptacles. The trash receptacles may be made from a rigid material like plastic or metal into which the thermoplastic bag may be placed to receive the refuse or trash. When the receptacle is full, the thermoplastic liner actually holding the trash may be removed for further disposal and replaced with a new liner.

The bags intended to be used as liners for such refuse containers may be made from low-cost, pliable or flexible thermoplastic material. The thermoplastic material may initially be in the form of a web that is processed into the finished bag. A desired characteristic of the thermoplastic web is that it has sufficient strength and toughness to avoid rupturing or puncturing as the bag is filled with refuse. It is also desirable to reduce the cost of the bag, which may be accomplished by reducing the amount of thermoplastic material used to make the bag. Accordingly, it is desirable to provide a thermoplastic bag that demonstrates both improved strength or toughness characteristics while reducing the overall costs associated with the bag.

BRIEF SUMMARY

A thermoplastic bag intended to be used as a trash receptacle liner may be formed with sidewalls arranged to provide an interior volume for receiving and holding the trash. To access the interior volume, an opening may be delineated by edges of the sidewalls. At least one sidewall may have a plurality of first ribs formed into the sidewall that have a first height. A second plurality of ribs may also be formed into the sidewall that have a second height that is greater than the first height.

The plurality of second ribs may be arranged or gathered into differentiated networks of parallel, adjacent ribs that may be partially extensive with each other, or may expand or stretch relative to each other. The second ribs may be formed from thermoplastic material that has been displaced with respect to or stretched outwardly from the plane of the web used to form the bag. The second ribs forming the networks may unbend or flatten out to become substantially more co-planar with the first ribs and the rest of the sidewall. This unbending or flattening of the second ribs may expand the network thereby increasing the area of the sidewall and hence the volume of the bag so that the bag may accommodate larger or bulky items.

In another aspect, the plastic bag may be produced through a high-speed manufacturing process which processes continuous webs of thermoplastic material into finished bags. The process may include adjacent first and second cylindrical rollers that can rotate in opposite rotational directions with respect to each other. The first roller may include a plurality of ridges protruding radially outward from the roller. At least some of the ridges may have segments of a first height and segments of a second height which are greater than the first height. The second roller may also include a plurality of ridges protruding radially outward from its cylindrical roller body. The rollers may be arranged so that the ridges of the first roller are received between the ridges of the second roller.

This same process may be modified to produce nonwoven sheets in addition to webs for bags. These nonwoven sheets may be then formed into products including, but not limited to, diapers (topsheet, outer cover, acquisition layer), floor cleaning pads, feminine care pads (topsheet, acquisition layer) and personal care and cleaning wipes.

In operation, the initially planar web of pliable thermoplastic material is directed in between the rotating rollers. As the web is directed between the rollers, the inter-fitting ridges of the first and second rollers may distort and stretch the web. In particular, the first segments of the first ridges may stretch the web material between the ridges on the second roller to form a plurality of first ribs in the web that correspond to the first segment height. Additionally, the second segments may stretch the web material to form a plurality of second ribs corresponding to the second segment height, which are thus greater than the height of the first ribs. The stretching of the first ribs may plastically set the thermoplastic material so as to result in increasing the overall area of the web available to form the finished bags. The stretched material corresponding to the second ribs may generally retain the shape of the inter-engaging ridges of the first and second rollers and therefore may be displaced with respect to the plane of the initial web. Once the web is processed into the finished bag, the second ribs may unbend or flatten to expand or increase the sidewall as mentioned above.

In another aspect, a thermoplastic web is provided which may be utilized in forming the bag or other items made from thermoplastic sheet material. The thermoplastic web may be processed through the first and second rollers described above to have a first plurality of ribs and a second plurality of ribs. Stretching of the thermoplastic material that accompanies formation of the first ribs may increase the overall area of the web. When a tensioning or pulling force is later applied to the web, the second ribs may unbend or flatten to increase the overall area of the web. The increase of the web area associated with formation of the first ribs provides more web material to process into finished goods. The increase in the web area associated with unbending of the second ribs provides the finished goods with an elastic or yieldable characteristic.

A possible advantage of the disclosure is that the thermoplastic bag may have an improved toughness or strength due to the presence of the second ribs in the sidewall. Another possible advantage of the disclosure is that processing the web through opposing rollers to form the first ribs stretches the web material and thereby increases the web material available for forming bags and other finished goods. These and other advantages and features will be apparent from the following detailed description and the accompanying drawings.

BRIEF DESCRIPTION OF THE DRAWINGS

FIG. 2 is a cross-sectional view of the bag sidewall taken along line 2-2 of FIG. 1 illustrating the first and second ribs.

FIG. 3 is a perspective view of the area indicated by circle 3-3 of FIG. 1 illustrating the first ribs and the second ribs formed in the thermoplastic sidewall material.

FIG. 4 is a cross-sectional view of the bag sidewall similar to that of FIG. 2 illustrating a substantially complete unbending or unfolding of the first and second ribs when a force is applied.

FIG. 5 is a perspective view similar to that of FIG. 3 illustrating the substantially complete unbending or unfolding of the first and second ribs when the force is applied.

FIG. 6 is a schematic representation of a high speed manufacturing process for producing thermoplastic bags with first and second ribs from a web of thermoplastic material including first and second rollers between which the web is directed.

FIG. 7 is a schematic representation of another embodiment of some steps of a manufacturing process for producing bags having first and second ribs.

FIG. 8 is a perspective view of the surface of the first and second rollers used to form the first and second ribs in the web during the process of FIG. 6.

FIG. 9 is a view of the area indicated by circle 9-9 of FIG. 6 illustrating the interaction of the ridges on the first and second rollers and a web being directed therebetween.

DESCRIPTION

Figure 1:
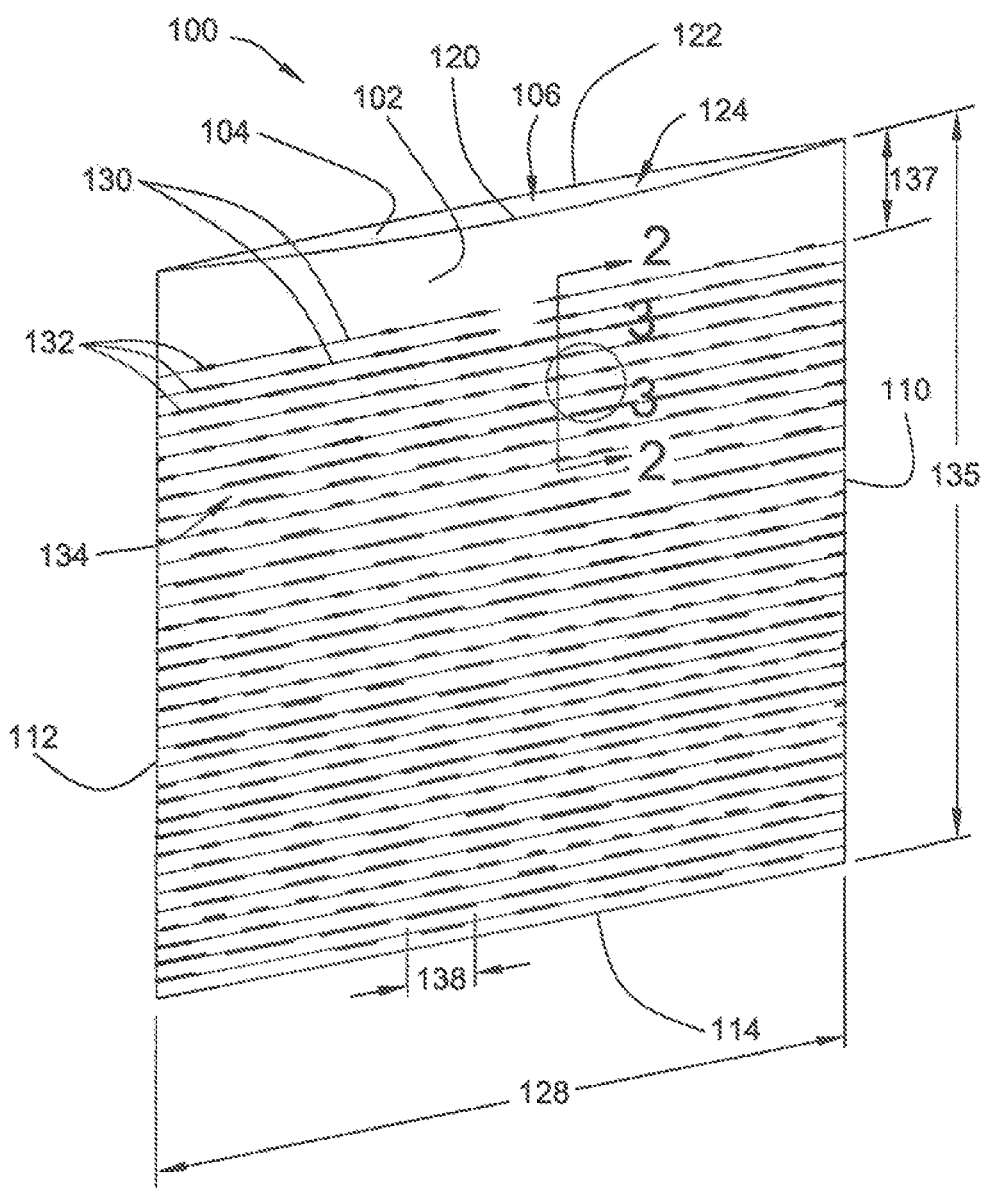
FIG. 1 is a perspective view of a thermoplastic bag for use as a trash receptacle liner having a plurality of first ribs and a plurality of second ribs formed into the sidewall.

Referring to FIG. 1, there is illustrated a thermoplastic bag 100 which may be used as a liner for trash receptacles and refuse containers. The bag 100 may be made from a first sidewall 102 and an opposing, second sidewall 104 that may be overlaid and joined to the first sidewall to define an interior volume 106. In the illustrated embodiment, the first and second sidewalls are rectangular in shape, but in other embodiments may have other suitable shapes. The first and second sidewalls 102, 104 may be joined together along a first side edge 110, a second side edge 112 spaced apart from the first side edge, and a bottom edge 114 that may extend between the first and second side edges. The sidewalls 102, 104 may be joined along their edges by any suitable joining process such as, for example, heat sealing in which the thermoplastic material bonds or melts together. Other sealing or joining processes may include ultrasonic methods and adhesive. In other embodiments, the bag 100 may include gussets that join the sidewalls about their peripheries. To access the interior volume 106, the top edges 120, 122 of the first and second sidewalls 102, 104 may remain un-joined to provide an opening 124. The un-joined top edges 120, 122 may be separated or pulled apart to open the bag 100.

The first and second sidewalls 102, 104 may be made of flexible or pliable thermoplastic material formed or drawn into a smooth, thin-walled web or sheet. Examples of suitable thermoplastic materials may include polyethylenes, such as, high density polyethylene, low density polyethylene, linear low density polyethylene, very low density polyethylene, polypropylene, ethylene vinyl acetate, nylon, polyester, ethylene vinyl alcohol, or ethylene-methyl acrylate, ethylene propylene copolymer and may be formed in combinations and in single or multiple layers. When used as a garbage receptacle liner, the thermoplastic material may typically be opaque but may also be transparent, translucent, or tinted. Furthermore, the material used for the sidewalls may be a gas impermeable material and may include other features such as being treated with deodorants and/or disinfectants as is sometimes desirable in the production of trash receptacle liners.

At least the first sidewall 102, and in some embodiments the second sidewall 104, may include a plurality of first ribs 130 and a plurality of second ribs 132 formed or disposed therein. In the illustrated embodiment, the first ribs 130 may be parallel with each other. The first ribs 130 may be parallel with the top edges 120, 122 and the bottom edge 114. The first ribs 130 may traverse the width of the bag 100 between the first and second side edges 110, 112 and may extend from the bottom edge 114 to be generally proximate with the top edges 120, 122. However, in other embodiments, the first ribs 130 may be intermittently spaced across the bag width and may be provided only over a portion of the bag height, such as, the bags shown in FIGS. 29-31. The first ribs 130 may be equally spaced apart from each other. In other embodiments, the first ribs 130 may be unequally spaced apart from each other.

The second ribs 132 also may be parallel with each other. The second ribs 132 may be parallel with the first ribs 130 such that the lengths of the second ribs are oriented with the width of the bag 100. In the illustrated embodiment, the second ribs 132 may be aligned with at least some of the first ribs 130. In other words, the location of at least one second rib 132 may coincide with or overlap the location of a first rib 130. The lengths of the second ribs 132 may be generally shorter than the lengths of the first ribs 130. For example, as illustrated in FIG. 1, the first ribs 130 may have a length commensurate with the width of the bag 100 between the first and second side edges 110, 112, including any portion of the first rib 130 that coincides with an aligned second rib 132. For example, the first rib 130 may have a length 128 commensurate with the width of the bag 100 between the first side edge 110 and the second side edge 112. The length 128 may have a first range from about 8 inches (20.32 cm) to about 40 inches (101.6 cm), a second range from about 23 inches (58.42 cm) to about 31 inches (78.74 cm), and a third range from about 23 inches (58.42 cm) to about 25 inches (63.5 cm). In one embodiment, the length 128 may be about 24 inches (60.96 cm). The second ribs 132 may have varying lengths with respect to each other. The maximum length of the second ribs, however, may be substantially less than the length of the first ribs. For example, the second ribs 132 may have a maximum length 138. The length 138 may have a first range from about 0.10 inches (0.25 cm) to about 3.00 inches (7.62 cm), a second range from about 0.20 inches (0.508 cm) to about 1.00 inches (2.54 cm), and a third range from about 0.20 inches (0.508 cm) to about 0.50 inches (1.27 cm). In one embodiment, the length 138 may be about 0.30 inches (0.76 cm).

The second ribs 132 may be arranged into a plurality of discrete or differentiated matrixes or networks 134 of multiple second ribs. For example, each network 134 of second ribs 132 may include a subset of the total plurality of second ribs that are immediately adjacent to one another. Additionally, the second ribs 132 in each network 134 are at least partially extensive with one another. In the illustrated embodiment, because the lengths of the second ribs 132 vary, the networks 134 may take on varying shapes such as the diamond shape that is illustrated. Thus, the networks 134 may appear to be superimposed over the first ribs 130 on the sidewall.

The bag 100 may have a height 135. The height 135 may have a first range from about 10 inches (25.4 cm) to about 48 inches (121.9 cm), a second range from about 24 inches (61 cm) to about 40 inches (101.6 cm), and a third range from about 27 inches (68.6 cm) to about 36 inches (91.4 cm). In one embodiment, the height 135 may be about 27.4 inches (69.6 cm). The ribs 130, 132 may terminate a distance 137 below the opening. The distance 137 may have a first range from about 1.5 inches (3.8 cm) to about 6 inches (15.2 cm), a second range from about 2 inches (5.1 cm) to about 5 inches (12.7 cm), and a third range from about 2.25 inches (5.7 cm) to about 4 inches (10.2 cm). In one embodiment, the distance 137 may be about 2.75 inches (7 cm).

Referring to FIGS. 2 and 3, the first ribs 130 and second ribs 132 are illustrated. In FIGS. 3, and 5, the lines 139 are for illustrative purposes to show the shape or topography of the surface. Referring to FIGS. 2 and 3, each of the first and second ribs 130, 132 may have a repeating but alternating V-shape, but in other embodiments the ribs may have other suitable shapes or forms. For example, the shape of the first and second ribs may be corrugated or sinusoidal in shape. As further described herein, the shape of the ribs may be imparted or impressed into the thin, planar web material that the bag sidewalls are made from.

The dimensions of the second ribs 132 may be greater than the dimensions of the first ribs 130. For example, referring to FIG. 2, each first rib 130 may have a first height 140 measured between an upper bend 146 of the rib and a lower bend 148. Each second rib 132 may have a second height 142 between an upper bend 150 of the rib and a lower bend 152. In the illustrated embodiments, the bends represent the lines at which the planar sidewall material bends or curves to become part of an adjacent rib. By way of example, the first height 140 may have a first range from about 0.0008 inches (0.002 cm) to about 0.05 inches (0.127 cm), a second range from about 0.0008 inches (0.002 cm) to about 0.02 inches (0.05 cm), and a third range from about 0.0008 inches (0.002 cm) to about 0.005 inches (0.0127 cm). In one embodiment, the first height 140 may be about 0.001 inches (0.0025 cm). The second height 142 may have a first range from about 0.0008 inches (0.002 cm) to about 0.10 inches (0.254 cm), a second range from about 0.005 inches (0.0127 cm) to about 0.060 inches (0.152 cm), and a third range from about 0.020 inches (0.051 cm) to about 0.050 inches (0.127 cm). In one embodiment, the second height 142 may be about 0.038 inches (0.096 cm). Furthermore, in the illustrated embodiment, the lower bends 148, 152 of both the first and second ribs 130, 132 may be aligned along the same plane 144 represented by a dashed line. Thus, the second ribs 132 may protrude further with respect to the plane 144 extending tangentially to the lower most bends 148, 152 than the first ribs 130.

The ribs 130 may have a peak to peak spacing or pitch 141. The pitch 141 may have a first range from about 0.02 inches (0.05 cm) to about 0.60 inches (1.52 cm), a second range from about 0.03 inches (0.076 cm) to about 0.40 inches (1.02 cm), and a third range from about 0.035 inches (0.089 cm) to about 0.20 inches (0.51 cm). In one embodiment, the pitch 141 may be about 0.04 inches (0.102 cm). The ribs 132 may have a peak to peak spacing or pitch 143. The pitch 143 may have a first range from about 0.02 inches (0.05 cm) to about 0.60 inches (1.52 cm), a second range from about 0.03 inches (0.07 cm) to about 0.40 inches (1.02 cm), and a third range from about 0.035 inches (0.089 cm) to about 0.20 inches (0.51 cm). In one embodiment, the pitch 143 may be about 0.04 inches (0.102 cm). The pitch 141 may be equal to the pitch 143 as shown in FIGS. 2 and 3, or the pitch 141 may be greater or less than the pitch 143.

However, as illustrated in FIGS. 4 and 5, when a pulling or tensioning force 156 is applied, the first ribs 130 may unbend or unfold to flatten out and become more co-planar with the plane 144. The force 156 may continue to be applied in greater amounts so that the material at the first ribs 130 begins to plastically stretch and the second ribs 132 begin to unbend, as is shown in FIGS. 4 and 5. Under these conditions, the pitch 143 may increase to a greater extent than the pitch 141. The height 142 may decrease such that it approaches or even is less that the height 140.

Referring to FIG. 1, this unbending or un-bunching action may increase or expand the area of the network 134 in which the second ribs 132 are gathered. As one or more networks 134 expand, the overall area of the sidewall 102 may increase to accommodate large or bulky items that are inserted into the interior volume 106. Because of the ability to expand, the sidewalls may be less susceptible to puncture or tear as objects are inserted into the bag. The thermoplastic material in which the ribs are formed may demonstrate some degree of shape memory causing the second ribs 132 to retake their original shape when the applied forces are removed. Thus, the web from which the bag is made may demonstrate some degree of elasticity or resiliency.

To produce a bag having first and second ribs as described herein, there is schematically illustrated in FIG. 6 a high speed manufacturing process 200 that may process continuous thermoplastic webs into the finished bags. The web 201 may be initially provided in a roll 202 that is unwound and directed along a machine direction 206 by the processing equipment. The web 201 may have an initial width 208 between a first edge 210 and a second edge 212 of the web. To provide the two opposing sidewalls of the finished bag, the web 201 may be folded by a folding operation 220. During the folding operation 220, the first edge 210 of the web 201 is moved adjacent to the second edge 212 so as to form a fold edge 226 that may run parallel with the machine direction 206. The folded web 201 may have a width 228 that is half of the original width 208.

To impart or form the ribs in the web, the processing equipment may include a first cylindrical roller 230 and an adjacent second cylindrical roller 232 between which the web 201 may be directed by the processing equipment. The first and second rollers 230, 232 may be arranged so that their longitudinal axes may be perpendicular to the machine direction 206 and may be adapted to rotate about their longitudinal axes in opposite rotational directions. In various embodiments, motors may be provided that power rotation of the rollers 230, 232 in a controlled manner. The first and second rollers 230, 232 may be made from any suitable material including, for example, metal, such as, steel or titanium.

The rollers 230, 232 may have ridges on the rollers which may impart the ribs into the web. After the web 201 has passed between the first and second rollers 230, 232, the web includes continuous longitudinal ribs 274 corresponding to the first ribs of the bag and intermittent ribs 276 that correspond to the taller ribs that are arranged in networks.

The processing equipment may further process the folded web after it passes between the rollers to produce the finished bag. For example, referring to FIG. 6, to form the side edges of the finished bag, the web 201 may proceed through a sealing operation 280 by which heat seals 282, perpendicular to the machine direction 206 and spaced intermittently along the web, are formed between the fold edge 226 and the adjacent edges 210, 212. The heat seals 282 may fuse together the adjacent halves of the folded web. After sealing the web halves together, a perforating operation 284 may form perforations 288 along the heat seals 282 to simplify detaching individual bags 290 from the remainder of the web. The perforations 288 may pierce through the web but allow the individual bags 290 to remain attached to each other. In another embodiment, the web may be folded one or more times prior to the perforation operation. The web of processed bags 290 may be wound up into a roll 292 for packaging and distribution. For example, the roll 292 may be placed into a box or bag for sale to a customer. In another embodiment illustrated in FIG. 7, web 201 may be cut into individual bags 290 along the heat seals 282 by cutting operation 294. In another embodiment, the web may be folded one or more times prior to the cutting operation. In another embodiment, the side sealing operation may be combined with the cutting operation.

Referring to FIG. 8, there is illustrated the surface 240 of the first roller 230 and the surface 242 of the second roller 232. The first surface 240 may include a plurality of teeth or ridges 244 that protrude outward from the roller. Each of the ridges 244 may be parallel to each other and may extend radially about the surface of the roller. Multiple ridges may be spaced along the axial length of the roller. Formed on the surface 242 of the second roller may also be a plurality of parallel teeth or ridges 248 that extend about the circumference of the roller and may be spaced along the axial length of the second roller. The first and second ridges 244, 248 may cooperate when the rollers are placed adjacent to each other and rotated in opposite directions. Each of the ridges 244, 248 may be in the shape of an inverted V.

To provide for the different heights of the first and second ribs, each ridge 244 on the first surface 240 may include first segments 250 having a first height 254 and second segments 252 having a second height 256. The second height 256 may be greater than the first height 254. The transition from the first height 254 to the second height 256 along segment 250 is preferably not a sharp, perpendicular transition, but is preferably curved and having a radius of transition between the first height 254 and the second height 256. By way of example, the first height 254 may have a first range from about 0.02 inches (0.05 cm) to about 0.4 inches (1.02 cm), a second range from about 0.04 inches (0.1 cm) to about 0.2 inches (0.51 cm), and a third range from about 0.06 inches (0.15 cm) to about 0.15 inches (0.38 cm). In one embodiment, the first height 254 may be about 0.062 inches (0.2 cm). The second height 256 may have a first range from about 0.02 inches (0.05 cm) to about 0.40 inches (1.02 cm), a second range from about 0.04 inches (0.10 cm) to about 0.20 inches (0.51 cm), and a third range from about 0.06 inches (0.15 cm) to about 0.15 inches (0.38 cm). In one embodiment, the second height 256 may be about 0.080 inches (0.20 cm). In one embodiment, the height 256 is greater than height 254. For example, the range of ratio of height 256 to height 254 can be from 1.01 to 20, or 1.05 to 10, or 1.10 to 5, or 1.10 to 2, or 1.20 to 4. In one example the ratio of height 256 to height 254 is 1.29. The ridges 248 on the second surface 242 may have heights and offsets complementary to the first and second segments or, as illustrated in FIG. 8, the ridges 248 may have a consistent height 258. The height 258 may have the same dimensional information as height 256. To form the desired shape on the cylindrical rollers, the rollers may be cast, ground or etched as appropriate.

Referring to FIG. 9, there is illustrated the interaction between the rotating first and second rollers 230, 232 as the web 201 is directed therebetween. The second segments 252 of the first roller 230 may protrude upwards a further distance than the first segments 250. To facilitate cooperation between the first and second rollers, the pattern of ridges 244 on the first roller 230 may be axially offset with respect to the pattern of ridges 248 on the second roller 232 so that the ridges of each roller can be received in and accommodated by the grooves formed between the ridges of the opposing roller. In the illustrated embodiment, the second ridges 248 have the same shape and size along the surface of the roller. In another embodiment, the second ridges 248 may have segments of different sizes where some protrude downwards a further distance than others. For example in one embodiment, the segments of 248 may protrude downwards to a greater extent matching the greater upward protruding segments 252 and ridges 248 may have segments protruding downwards to a lesser extent matching the lesser upward protruding segments 250. In another embodiment, the segments of 248 may protrude downwards to a lesser extent matching the greater upward protruding segments 252 and ridges 248 may have segments protruding downwards to a greater extent matching the lesser upward protruding segments 250.

Referring to FIG. 9, as the web 201 is directed between the rollers, the ridges 244 on the first roller 230 displace the web material between the ridges 248 on the second roller 232. To facilitate displacement of the web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

The first segments 250 on the first roller 230 and the second ridges 248 on the second roller 232 may have a depth of engagement 260. By way of example, the depth of engagement 260 may have a first range from about 0.01 inches (0.025 cm) to about 0.055 inches (0.14 cm), a second range from about 0.02 inches (0.05 cm) to about 0.045 inches (0.11 cm), and a third range from about 0.020 inches (0.05 cm) to about 0.035 inches (0.09 cm). In one embodiment, the depth of engagement 260 may be about 0.028 inches (0.07 cm). The second segments 252 on the first roller 230 and the second ridges 248 on the first roller 232 have a depth of engagement 262. The depth of engagement 262 may have a first range from about 0.01 inches (0.025 cm) to about 0.055 inches (0.140 cm), a second range from about 0.02 inches (0.05 cm) to about 0.045 inches (0.11 cm), and a third range from about 0.025 inches (0.06 cm) to about 0.04 inches (0.102 cm). In one embodiment, the depth of engagement 262 may be about 0.038 inches (0.096 cm). Because the second segments 252 have a greater size than the first segments 250, the depth of engagement is correspondingly greater.

The first segments 250 may have a peak to peak spacing or pitch 241. The pitch 241 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.089 cm) to about 0.075 inches (0.191 cm). In one embodiment, the pitch 241 may be about 0.040 inches (0.102 cm). The second segments 252 may have a peak to peak spacing or pitch 243. The pitch 243 may have the same dimensional information as pitch 241.

As the web 201 is advanced between the rollers 230, 232 that are rotating in opposite rotational directions, cooperation between the ridges 244, 248 may deform the web into a corrugated or ribbed pattern conforming to the ridges, as illustrated in FIG. 9. As the first segments 250 are received between the second ridges 248, the web material 201 may stretch out approximately commensurate with the depth of engagement 260. In an embodiment, the stretching of the web 201 may impart or form a ribbed appearance to the web that corresponds to the first ribs 130. In a further embodiment, the stretching of the web material may allow the web to grow or extend longitudinally. As illustrated in FIG. 6, the web 201 may engage one or more nip rollers 272 which may pull on the web 201 and may cause the first ribs 130 to spread open or flatten. The nip rollers 272 may be at an angle 273 to the machine direction 206. The angle 273 may have a first range from about 0 degrees to about 45 degrees, a second range from about 5 degrees to about 30 degrees, and a third range from about 10 degrees to about 20 degrees. In one embodiment, the angle 273 may be about 15 degrees. The web 201 may be wider after passing between the nip rollers 272, as indicated by width 270.

Because the surface area of the web material is increased, it will be appreciated that more bags of a given volume can be made from the web material than prior to rolling. Thus, one possible result of rolling the web material is the cost savings benefit that the process provides. Another possible result of stretching the web out via the interacting rollers is that the molecules of the thermoplastic material may realign or re-orientate themselves. This may result in the web material corresponding to the first rib becoming stronger compared to the same thickness of a web material which was not stretched via the rollers.

Referring to FIG. 9, the interaction between the larger second segments 252 on the first roller 230 and the ridges 248 on the second roller 232 may stretch the web material out a greater amount than the interaction between the first segments 250 and the second ridges 248. The greater amount of stretching may result in the web maintaining a shape corresponding to the protruding ridges on the cylindrical rollers. Thus, after the web has been processed, the second ribs 132 may retain the alternating V- or U-shape corresponding to the ridges. That shape may unbend or flatten out to expand the bag as described herein. Because the second ribs retain their shape after being stretched by interacting ridges, they may not substantially add to the increased width 270 of the web.

Figure 10:
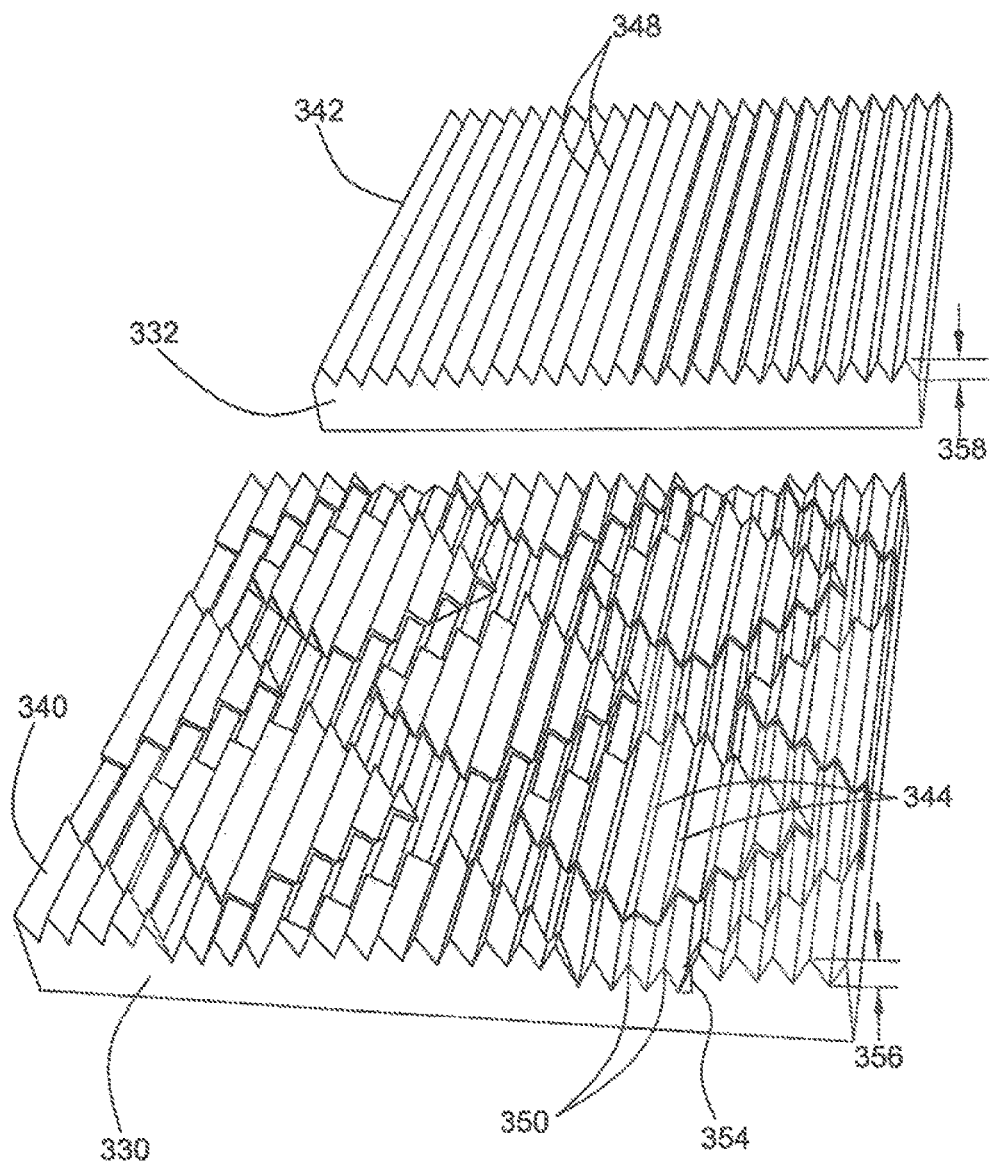
FIG. 10 is a perspective view of another embodiment of the surface of the first and second rollers.
Figure 11:
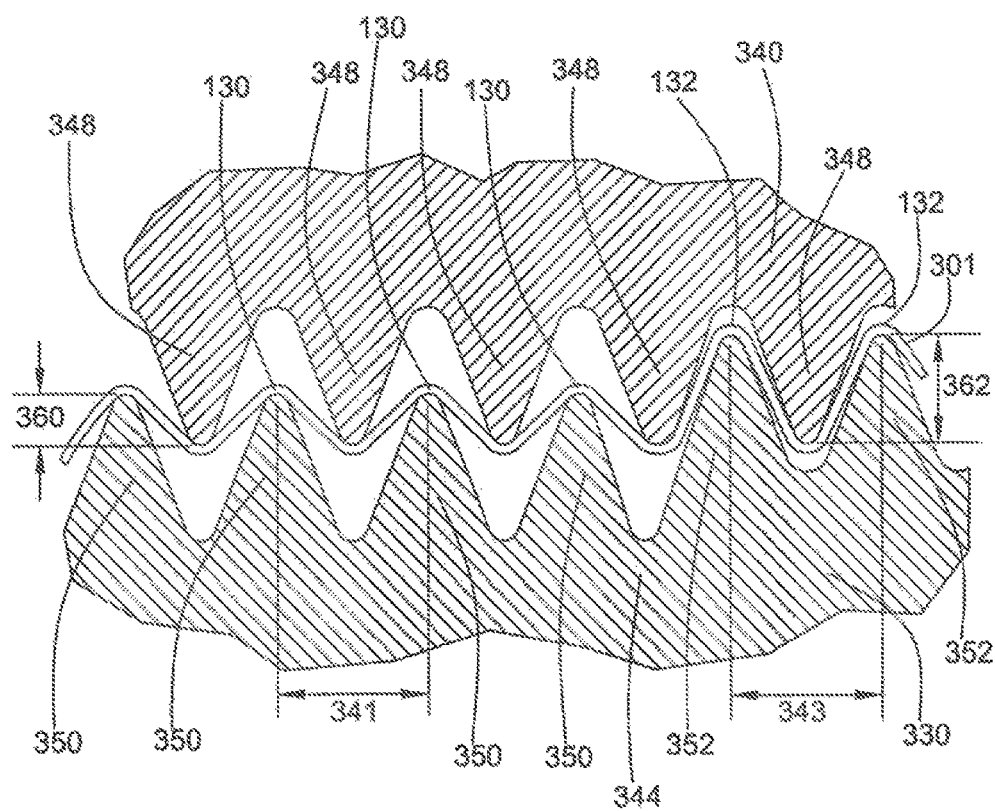
FIG. 11 is a cross-sectional view illustrating the interaction of the web and the ridges for the embodiment shown in FIG. 10.

Referring to FIGS. 10-11, there is illustrated another embodiment of rollers which may be similar to rollers 230, 232 in FIGS. 8-9 except that the rollers 330, 332 have first segments 350 with a different shape or height. Referring to FIG. 10, there is illustrated the surface 340 of the first roller and the surface 342 of the second roller. The first surface 340 may include a plurality of teeth or ridges, or ridge group 344 that protrude outward from the roller. Each of the ridges 344 may be parallel to each other and may extend radially about the surface of the roller. Multiple ridges may be spaced along the axial length of the roller. Formed on the surface 342 of the second roller may also be a plurality of parallel teeth or ridges 348 that extend about the circumference of the roller and may be spaced along the axial length of the second roller. The first and second ridges 344, 348 may cooperate when the rollers are placed adjacent to each other and rotated in opposite directions. Each of the ridges 344, 348 may be in the shape of an inverted V.

To provide for the different heights of the first and second ribs, each ridge 344 on the first surface 340 may include first segments 350 having a first height 354 and second segments 352 having a second height 356. The second height 356 may be greater than the first height 354. By way of example, the first height 354 may have a first range from about 0.02 inches (0.05 cm) to about 0.40 inches (1.02 cm), a second range from about 0.04 inches (0.10 cm) to about 0.20 inches (0.51 cm), and a third range from about 0.06 inches (0.15 cm) to about 0.15 inches (0.38 cm). In one embodiment, the first height 354 may be about 0.08 inches (0.20 cm). The second height 356 may have the same dimensional information as height 256 in FIG. 8. The ridges 348 on the second surface 342 may have heights and offsets complementary to the first and second segments or, as illustrated in FIG. 10, the ridges 348 may have a consistent height 358. The height 358 may have the same dimensional information as height 258 in FIG. 8. To form the desired shape on the cylindrical rollers, the rollers may be cast, ground or etched as appropriate.

Referring to FIG. 11, there is illustrated the interaction between the rotating first and second rollers 330, 332 as the web 301 is directed therebetween. The second segments 352 of the first roller 330 may protrude upwards a further distance than the first segments 350. To facilitate cooperation between the first and second rollers, the pattern of ridges 344 on the first roller 330 may be axially offset with respect to the pattern of ridges 348 on the second roller 332 so that the ridges of each roller can be received in and accommodated by the grooves formed between the ridges of the opposing roller. In the illustrated embodiment, the second ridges 348 have the same shape and size along the surface of the roller. In another embodiment, the second ridges 348 may have shapes and sizes complementary or converse to that of the first and second segments 350, 352. As the web 301 is directed between the rollers, the ridges 344 on the first roller 330 force or displace the web material between the ridges 348 on the second roller 332. To facilitate displacement of the web between the ridges of the rollers, the rollers may be pressed or forced together, for example, by hydraulic equipment or other equipment, such as hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

The first segments 350 on the first roller 330 and the second ridges 348 on the second roller 332 may have a depth of engagement 360. By way of example, the depth of engagement 360 may have the same dimensional information as depth of engagement 260 in FIG. 9. The second segments 352 on the first roller 330 and the second ridges 348 on the first roller 332 have a depth of engagement 362. The depth of engagement 362 may have the same dimensional information as depth of engagement 262 in FIG. 9.

The segments 350 may have a peak to peak spacing or pitch 341. The pitch 341 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.089 cm) to about 0.075 inches (0.191 cm). In one embodiment, the pitch 341 may be about 0.04 inches (0.102 cm). The segments 352 may have a pitch 343. The pitch 343 may have the same dimensional information as pitch 341. In one embodiment, the pitch 343 may be the same as pitch 341.

As the web 301 is advanced between the rollers 330, 332 that are rotating in opposite rotational directions, cooperation between the ridges 344, 348 may deform the web into a corrugated or ribbed pattern conforming to the ridges, as illustrated in FIG. 11. As the first segments 350 are received between the second ridges 348, the web material 301 may stretch out approximately commensurate with the depth of engagement 360. In an embodiment, the stretching of the web 301 may impart or form a ribbed appearance to the web that corresponds to the first ribs 130. In a further embodiment, the stretching of the web material may cause the web to grow or extend longitudinally. Thus, the web 301 may be wider after passing between the first and second rollers 330, 332.

Because the surface area of the web material is increased, it will be appreciated that more bags of a given volume can be made from the web material than prior to rolling. Thus, one possible result of rolling the web material is the cost savings benefit that the process provides. Another possible result of stretching the web out via the interacting rollers is that the molecules of the thermoplastic material may realign or re-orientate themselves. This may result in the web material corresponding to the first rib becoming stronger compared to the same thickness of a web material which was not stretched via the rollers.

Referring to FIG. 11, the interaction between the larger second segments 352 on the first roller 330 and the ridges 348 on the second roller 332 may stretch the web material out a greater amount than the interaction between the first segments 350 and the second ridges 348. The greater amount of stretching may result in the web maintaining a shape corresponding to the protruding ridges on the cylindrical rollers. Thus, after the web has been processed, the second ribs 132 may retain the alternating V- or U-shape corresponding to the ridges. That shape may unbend or flatten out to expand the bag as described herein. Because the second ribs retain their shape after being stretched by interacting ridges, they may not substantially add to the increased width of the web.

Figure 12:
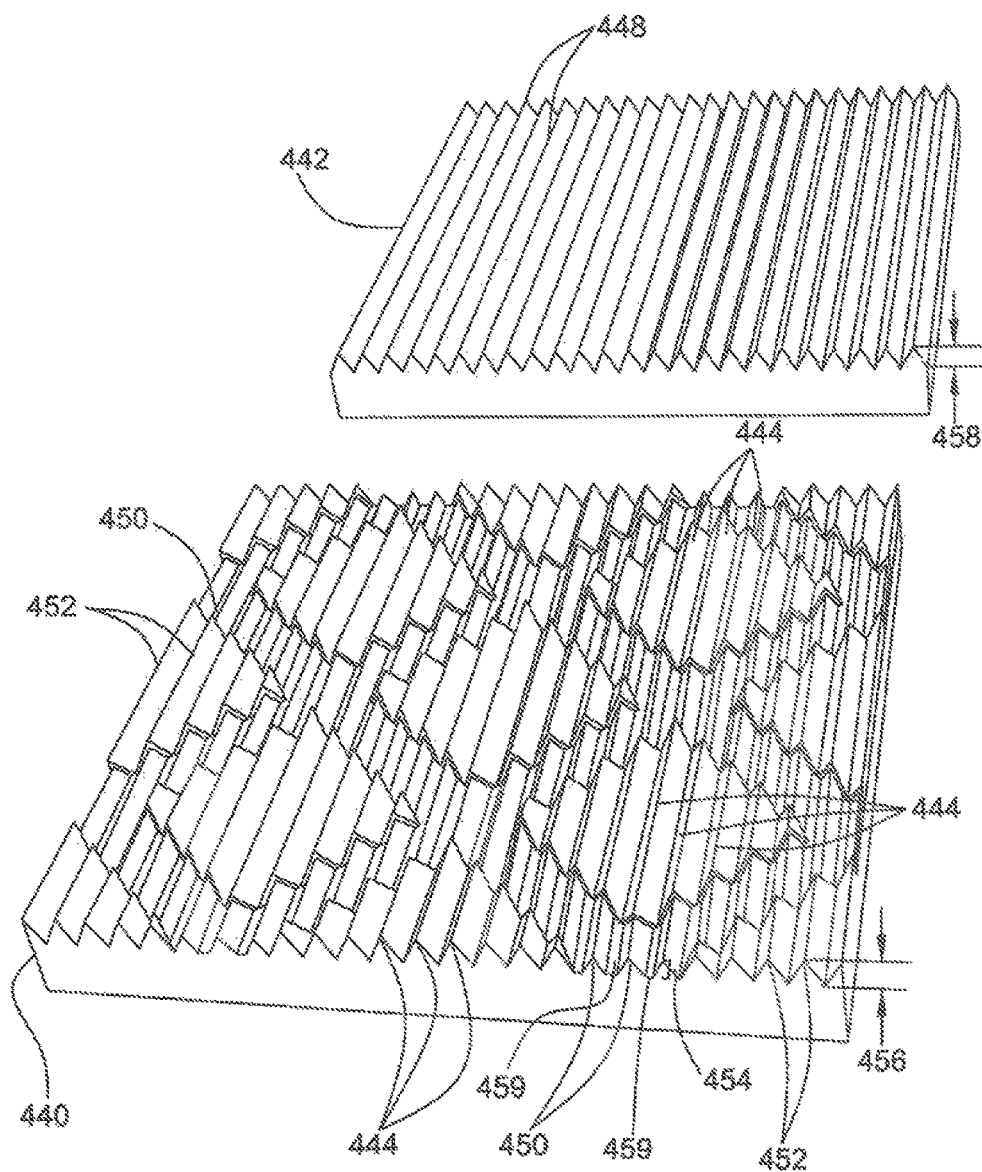
FIG. 12 is a perspective view of another embodiment of the surface of the first and second rollers.
Figure 13:
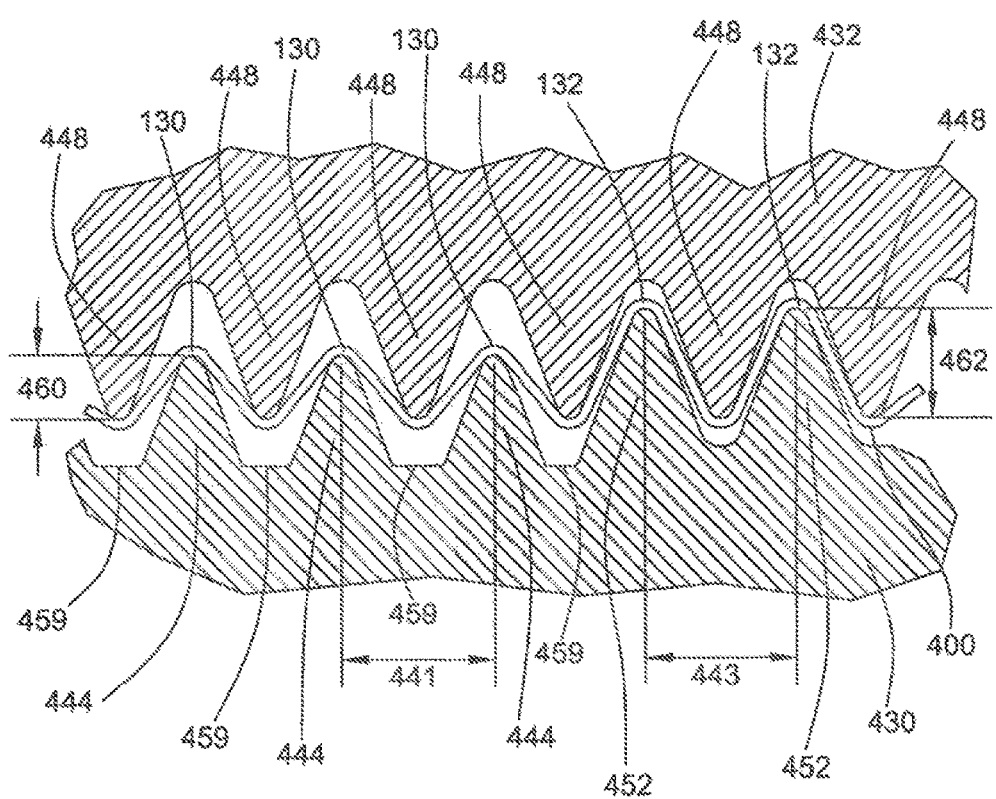
FIG. 13 is a cross-sectional view illustrating the interaction of the web and the ridges for the embodiment shown in FIG. 12.

Referring to FIGS. 12-13, there is illustrated another embodiment of rollers which may be similar to rollers 330, 332 in FIGS. 10-11 except that the rollers 430, 432 have first segments 450 with a different shape 459 between segments. Referring to FIG. 12, there is illustrated the surface 440 of the first roller and the surface 442 of the second roller. The first surface 440 may include a plurality of teeth or ridges 444 that protrude outward from the roller. Each of the ridges 444 may be parallel to each other and may extend radially about the surface of the roller. Multiple ridges may be spaced along the axial length of the roller. Formed on the surface 442 of the second roller may also be a plurality of parallel teeth or ridges 448 that extend about the circumference of the roller and may be spaced along the axial length of the second roller. The first and second ridges 444, 448 may cooperate when the rollers are placed adjacent to each other and rotated in opposite directions. Each of the ridges 444, 448 may be in the shape of an inverted V.

To provide for the different heights of the first and second ribs, each ridge 444 on the first surface 440 may include first segments 450 having a first height 454 and second segments 452 having a second height 456. The second height 456 may be greater than the first height 454. By way of example, the first height 454 may have a first range from about 0.02 inches (0.05 cm) to about 0.40 inches (1.02 cm), a second range from about 0.04 inches (0.10 cm) to about 0.20 inches (0.51 cm), and a third range from about 0.06 inches (0.15 cm) to about 0.15 inches (0.38 cm). In one embodiment, the first height 454 may be about 0.06 inches (0.15 cm). The second height 456 may have the same dimensional information as height 256 in FIG. 8. The ridges 448 on the second surface 442 may have heights and offsets complementary to the first and second segments or, as illustrated in FIG. 12, the ridges 448 may have a consistent height 458. The height 458 may have the same dimensional information as height 258 in FIG. 8. To form the desired shape on the cylindrical rollers, the rollers may be cast, ground or etched as appropriate.

Referring to FIG. 13, there is illustrated the interaction between the rotating first and second rollers 430, 432 as the web 401 is directed therebetween. The second segments 452 of the first roller 430 may protrude upwards a further distance than the first segments 450. To facilitate cooperation between the first and second rollers, the pattern of ridges 444 on the first roller 430 may be axially offset with respect to the pattern of ridges 448 on the second roller 332 so that the ridges of each roller can be received in and accommodated by the grooves formed between the ridges of the opposing roller. In the illustrated embodiment, the second ridges 448 have the same shape and size along the surface of the roller. In another embodiment, the second ridges 448 may have shapes and sizes complementary or converse to that of the first and second segments 450, 452. A flat area 459 may be located between the first segments 450 and may provide a tooling manufacturing benefit. As the web 401 is directed between the rollers, the ridges 444 on the first roller 430 force or displace the web material between the ridges 448 on the second roller 432. To facilitate displacement of the web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

The first segments 444 on the first roller 430 and the second ridges 448 on the second roller 432 may have a depth of engagement 460. By way of example, the depth of engagement 460 may have the same dimensional information as depth of engagement 260 in FIG. 9. The second segments 452 on the first roller 430 and the second ridges 448 on the first roller 432 may have a depth of engagement 462. The depth of engagement 462 may have the same dimensional information as depth of engagement 262 in FIG. 9.

The segments 444 may have a peak to peak spacing or pitch 441. The pitch 441 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.084 cm) to about 0.075 inches (0.191 cm). In one embodiment, the pitch 441 may be about 0.04 inches (0.102 cm). The segments 452 may have a pitch 443. The pitch 443 may have the same dimensional information as pitch 441. In one embodiment, the pitch 443 may be the same as pitch 441.

As the web 401 is advanced between the rollers 430, 432 that are rotating in opposite rotational directions, cooperation between the ridges 444, 448 may deform the web into a corrugated or ribbed pattern conforming to the ridges, as illustrated in FIG. 13. As the first segments 450 are received between the second ridges 448, the web material 401 may stretch out approximately commensurate with the depth of engagement 460. In an embodiment, the stretching of the web 401 may impart or form a ribbed appearance to the web that corresponds to the first ribs 130. In a further embodiment, the stretching of the web material may cause the web to grow or extend longitudinally. Thus, the web 401 may be wider after passing between the first and second rollers 430, 432.

Because the surface area of the web material is increased, it will be appreciated that more bags of a given volume can be made from the web material than prior to rolling. Thus, one possible result of rolling the web material is the cost savings benefit that the process provides. Another possible result of stretching the web out via the interacting rollers is that the molecules of the thermoplastic material may realign or re-orientate themselves. This may result in the web material corresponding to the first rib becoming stronger compared to the same thickness of a web material which was not stretched via the rollers.

Referring to FIG. 13, the interaction between the larger second segments 452 on the first roller 430 and the ridges 448 on the second roller 432 may stretch the web material out a greater amount than the interaction between the first segments 444 and the second ridges 448. The greater amount of stretching may result in the web maintaining a shape corresponding to the protruding ridges on the cylindrical rollers. Thus, after the web has been processed, the second ribs 132 may retain the alternating V- or U-shape corresponding to the ridges. That shape may unbend or flatten out to expand the bag as described herein. Because the second ribs retain their shape after being stretched by interacting ridges, they may not substantially add to the increased width of the web.

Figure 14:
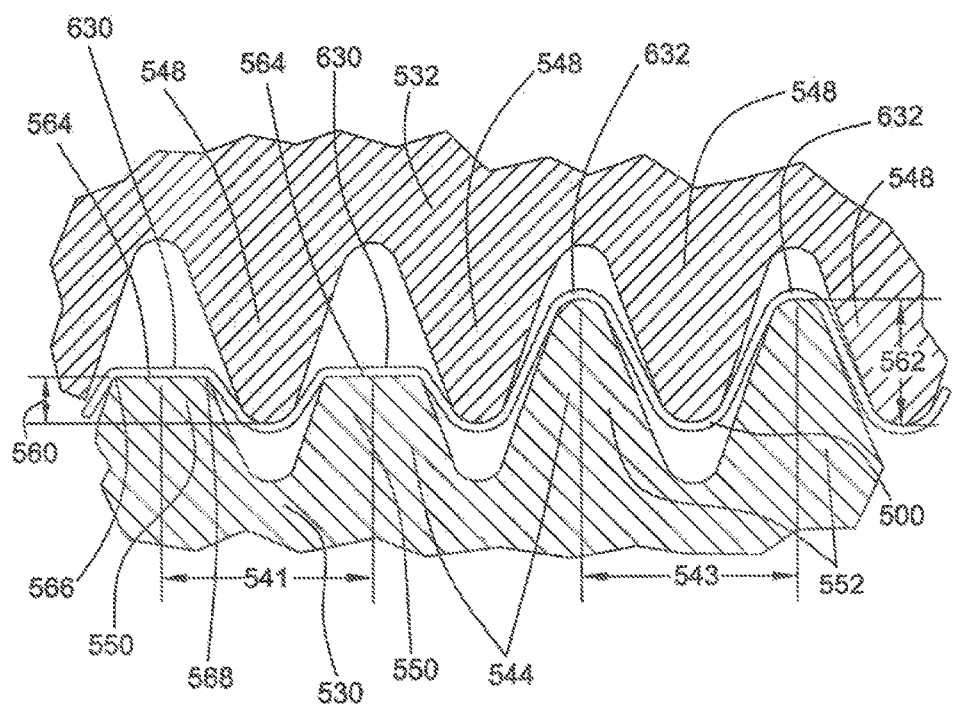
FIG. 14 is a cross-sectional view illustrating the interaction of ridges on another embodiment of first and second rollers and a web being directed therebetween.

Referring to FIG. 14, there is illustrated another embodiment of a first roller 530 and an adjacent second roller 532 that may form the ribs in a thermoplastic web 500 that is directed between the rollers. The first roller 530 includes a plurality of upward projecting, ridges 544 that may extend radially about the roller. The ridges 544 may include first segments 550 having a first height corresponding to the shorter first ribs 630 and second segments 552 having a second height and corresponding to the second ribs 632. The first and second segments can be received between the second ridges 548 on the second roller 532. The first segments 550 may have a depth of engagement 560 with the ridges 548 on the second roller. The depth of engagement 560 may have a first range from about 0.01 inches (0.025 cm) to about 0.055 inches (0.14 cm), a second range from about 0.02 inches (0.05 cm) to about 0.045 inches (0.11 cm), and a third range from about 0.02 inches (0.05 cm) to about 0.035 inches (0.09 cm). In one embodiment, the depth of engagement 560 may be about 0.025 inches (0.07 cm). The second segments 552 may have a depth of engagement 562 with the ridges 548. The depth of engagement 562 may have the same dimensional information as the depth of engagement 262 in FIG. 9. Accordingly, the second segments 552 may stretch the material out a greater extent than the first segments 550.

The segments 550 may have a peak to peak spacing or pitch 541. The pitch 541 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.084 cm) to about 0.075 inches (0.191 cm). In one embodiment, the pitch 541 may be about 0.04 inches (0.102 cm). The segments 552 may have a pitch 543. The pitch 543 may have the same dimensional information as pitch 541. In one embodiment, the pitch 543 may be the same as pitch 541.

To manufacture the first roller 530 with the first and second segments 550, 552 of differing height, the roller can initially be cast or cut with V-shaped ridges of all one height and shape that corresponds to the larger second segments 552. Some selected ridges may then be ground down to form the shorter first segments 550. Grinding down the V-shaped ridges results in the first segments 550 having a truncated shape with a flat, uppermost surface 564 and edges 566, 568. Thus, the ribs 630 produced by the first segments 550 may have a shape matching the truncated first segments 550 including two lines corresponding to the corners of the first segment 550.

Figure 15:
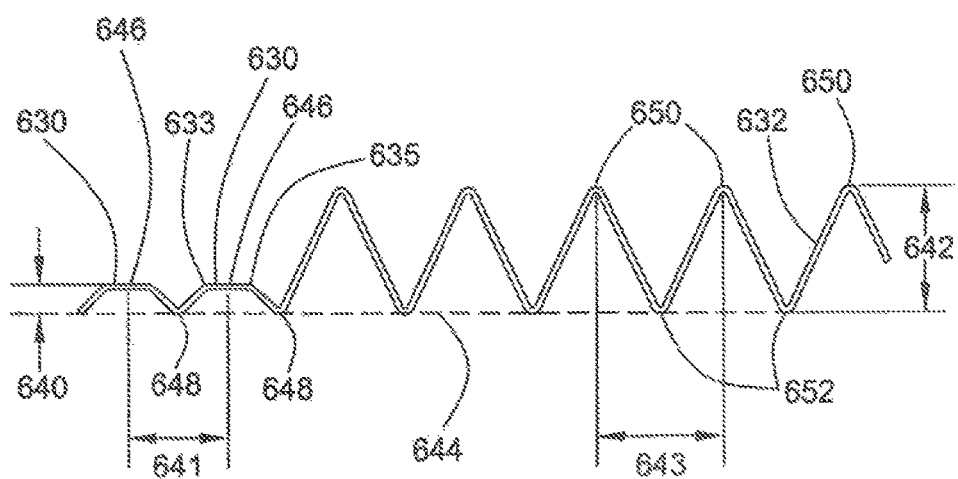
FIG. 15 is a cross-sectional view of the web of FIG. 14.

Referring to FIG. 15, the first ribs 630 and second ribs 632 may be created by using the rollers 530, 532 in FIG. 14. The first ribs 630 may be similar to ribs 130 in FIG. 2 except that ribs 630 may have a different shape. The second ribs 632 may be similar to ribs 132 in FIG. 2. For example, the second ribs 632 may be arranged into a plurality of discrete or differentiated matrixes or networks of multiple second ribs.

The first ribs 630 may have a truncated V-shape which may correspond to the truncated first segments 550 in FIG.

14. The first ribs 630 may have bends 633, 635 formed into the rib 630 which may correspond to the edges 566, 568 in FIG. 14.

Referring to FIG. 15, the second ribs 632 may have a repeating but alternating V-shape, but in other embodiments the ribs may have other suitable shapes or forms. For example, the shape of the second rib may be corrugated or sinusoidal in shape.

The dimensions of the second ribs 632 may be greater than the dimensions of the first ribs 630. For example, referring to FIG. 15, each first rib 630 may have a first height 640 measured between an upper surface 646 of the rib and a lower bend 648. Each second rib 632 may have a second height 642 between an upper bend 650 of the rib and a lower bend 652. In the illustrated embodiments, the bends represent the lines at which the planar sidewall material bends or curves to become part of an adjacent rib. For example, the first height 640 may have the same dimensional information as the height 140 in FIG. 2. The second height 642 may have the same dimensional information as the height 142 in FIG. 2.

The ribs 630 may have a spacing or pitch 641. The pitch 641 may have the same dimensional information as pitch 141 in FIG. 2. The ribs 632 may have a spacing or pitch 643. The pitch 643 may have the same dimensional information as pitch 143 in FIG. 2.

Furthermore, in the illustrated embodiment, the lower bends 648, 652 of both the first and second ribs 630, 632 may be aligned along the same plane 644 represented by a dashed line. Thus, the second ribs 632 may protrude further with respect to the plane 644 extending tangentially to the lower most bends 648, 652 than the first ribs 630.

The first ribs 630 may operate in a manner similar to ribs 130 in FIG. 2 in order to increase the size of the material. The properties of the first ribs 630, including the increase in size of the material, may be similar to the properties of the first ribs 130 in FIG. 2. The second ribs 632 may operate in a manner similar to ribs 132 in FIGS. 4 and 5.

Figure 16:
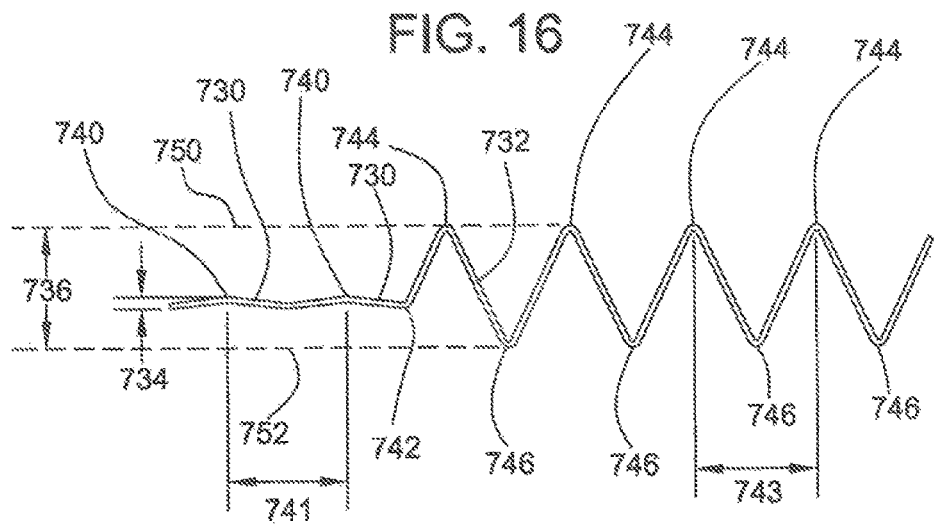
FIG. 16 is a cross-sectional view illustrating another embodiment of a thermoplastic web having a plurality of first ribs and a plural of second ribs formed therein.
Figure 17:
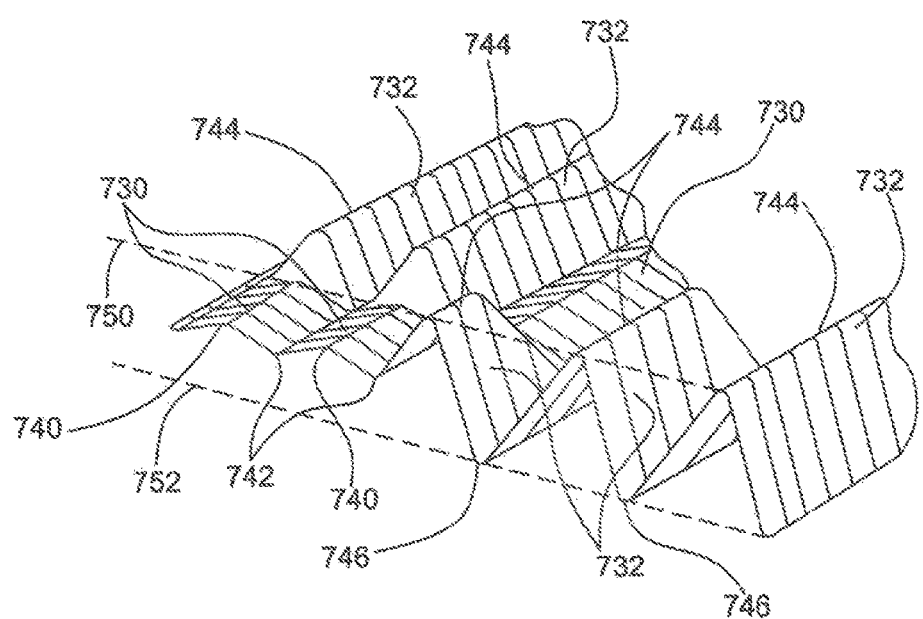
FIG. 17 is a perspective view of the embodiment of the web of FIG. 16 illustrating the first ribs and the second ribs formed in the thermoplastic sidewall material.

Referring to FIGS. 16 and 17, there is illustrated another embodiment of a thermoplastic web 701 that has a plurality of first ribs 730 and a plurality of second ribs 732 formed into it. In FIG. 17, the lines 739 are for illustrative purposes to show the shape or topography of the surface. Referring to FIGS. 16 and 17, the ribs 730, 732 may take the form of alternating V-shaped ribs and the first ribs 730 may be aligned with the second ribs 732. The height of the second ribs 732 may be larger than the first ribs 730. For example, the first ribs 730 may have a height 734 between the upper bend 740 and the lower bend 742. The height 734 may have a first range from about 0.0008 inches (0.002 cm) to about 0.05 inches (0.127 cm), a second range from about 0.0008 inches (0.002 cm) to about 0.02 inches (0.05 cm), and a third range from about 0.0008 inches (0.002 cm) to about 0.005 inches (0.0127 cm). In one embodiment, the height 734 may be about 0.001 inches (0.0025 cm). The second ribs 732 may have a height 736 between the upper bend 744 and the lower bend 746, the height 736 may have the same dimensional information as the height 142 in FIG. 2. Thus, the second ribs 732 are taller than the first ribs 730.

The ribs 730 may have a spacing or pitch 741. The pitch 741 may have the same dimensional information as pitch 141 in FIG. 2. The ribs 732 may have a spacing or pitch 743. The pitch 743 may have the same dimensional information as pitch 143 in FIG. 2.

The lower bends 742 of the first ribs 730 may not be aligned along the same plane as the lower bends 746 of the second ribs 732. The first ribs 730 may be situated in between and spaced from an upper plane 750 and a lower plane 752 defined by the respective upper and lower bends 744, 746 of the second ribs 732. The second ribs 732 may also be arranged in networks similar to those described with respect to FIG. 1.

Figure 18:
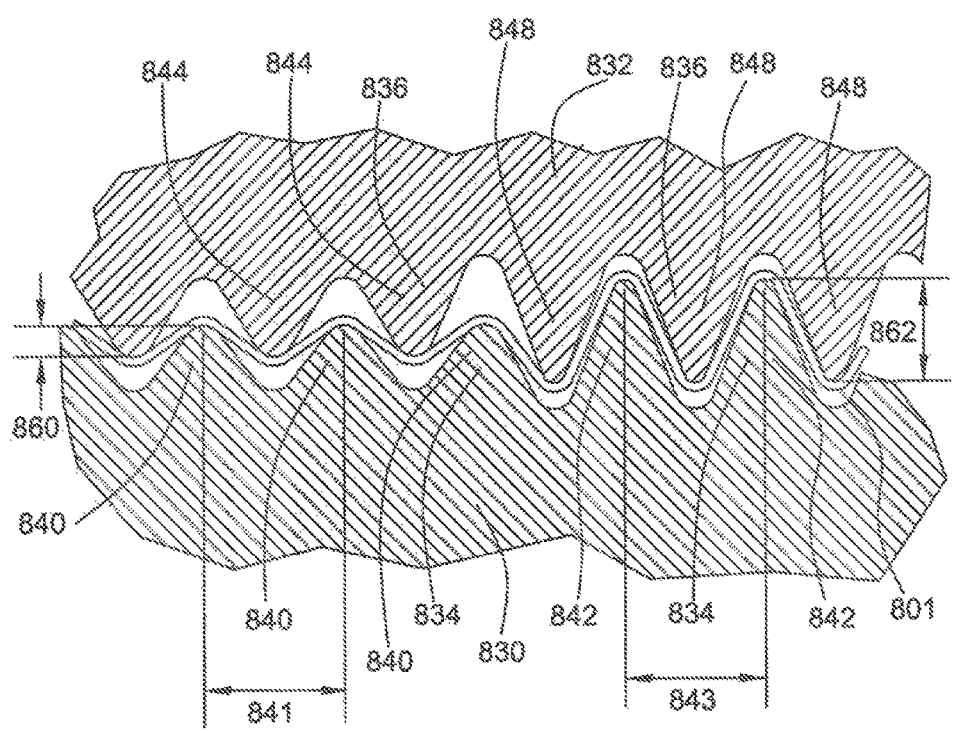
FIG. 18 is a cross-sectional view illustrating the interaction between the ridges of another embodiment of the first and second rollers used to produce the web illustrated in FIGS. 16 and 17.

Referring to FIG. 18, there is illustrated adjacent first and second rollers 830, 832 that may be used to process a web 801 having the characteristics discussed with respect to FIGS. 16 and 17. The first roller 830 may have a plurality of radially projecting ridges 834 that extend about the first roller 830 and that may be received between a plurality of axially offset ridges 836 on the second roller 832. The first ridges 834 on the first roller 830 may include first segments 840 and second segments 842 in which the first segments 840 radially project from the cylindrical roller body a shorter distance than the second segments 842. Also, the second roller 832 may also have shorter first segments 844 and larger second segments 848 that may intermesh or cooperate with the corresponding segments 840, 842 on the first roller. As illustrated, the larger second segments 842, 848 extend or project above and below the smaller first segments 840, 844 so that the formed web has its smaller first ribs located between planes defined by the upper and lower extents of the larger second ribs.

The segments 840 may have a depth of engagement 860 with the segments 844 on the second roller. The depth of engagement 860 may have a first range from about 0.01 inches (0.025 cm) to about 0.055 inches (0.014 cm), a second range from about 0.02 inches (0.05 cm) to about 0.045 inches (0.11 cm), and a third range from about 0.020 inches (0.051 cm) to about 0.035 inches (0.090 cm). In one embodiment, the depth of engagement 860 may be about 0.025 inches (0.070 cm). The second segments 842 may have a depth of engagement 862 with the segments 848. The depth of engagement 862 may have the same dimensional information as the depth of engagement 262 in FIG. 9. Accordingly, the second segments 842, 848 may stretch the material out a greater extent than the first segments 840, 844.

The segments 840 may have a peak to peak spacing or pitch 841. The pitch 841 may have a first range from about 0.02 inches (0.051 cm) to about 0.20 inches (0.51 cm), a second range from about 0.03 inches (0.076 cm) to about 0.10 inches (0.25 cm), and a third range from about 0.035 inches (0.089 cm) to about 0.075 inches (0.191 cm). In one embodiment, the pitch 841 may be about 0.04 inches (0.10 cm). The segments 842 may have a pitch 843. The pitch 843 may have the same dimensional information as pitch 841. In one embodiment, the pitch 843 may be the same as pitch 841.

Figure 19:
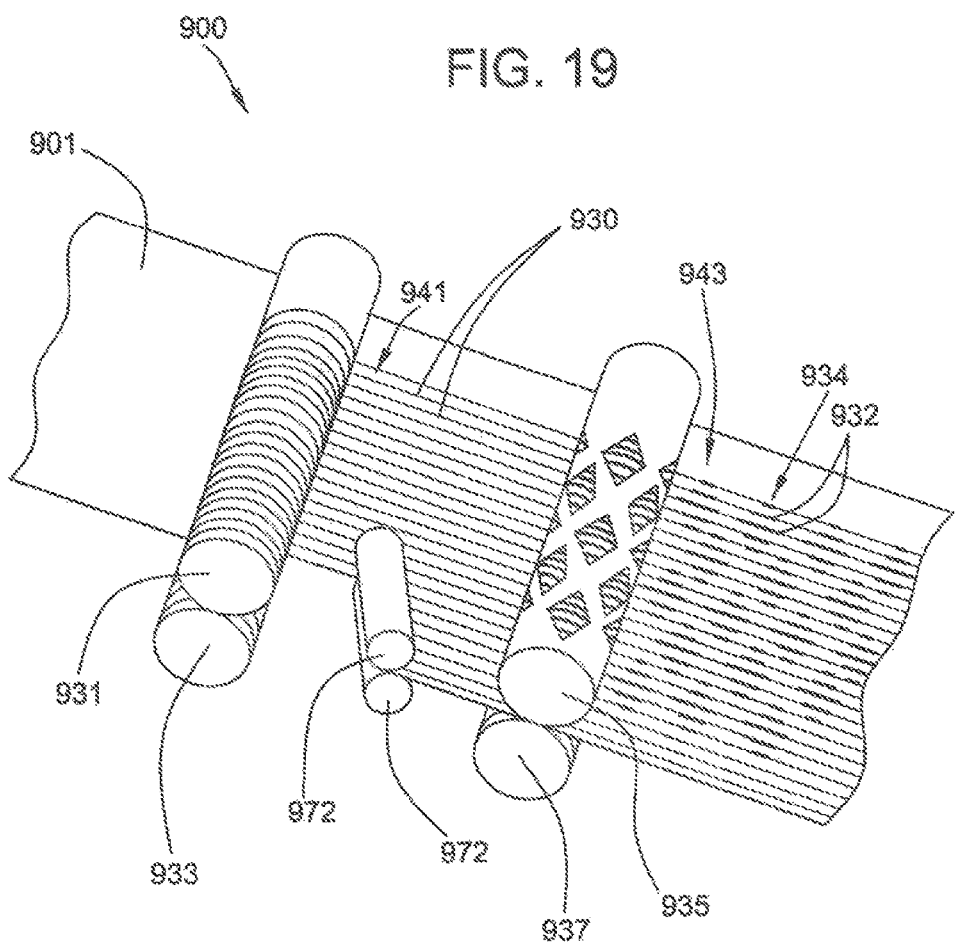
FIG. 19 is a schematic representation of another embodiment of some steps of a manufacturing process for producing bags having first and second ribs.

Referring to FIG. 19, another embodiment of a process for making bags is shown. The process 900 may be similar to process 200 shown in FIGS. 6 and 7, except the rollers 230, 232 may be replaced by rollers 931, 933 and rollers 935, 937. The rollers 931, 933 may apply a pattern 941 of first ribs 930 to the web 901. The pattern 941 may be a series of ribs 930. The ribs 930 may be linear. The rollers 935, 937 may apply a pattern 943 of second ribs 932 to the web 901. The pattern 943 may be a network 934 of ribs 932 which may be applied over the pattern 941.

The second ribs 932 may be arranged into a plurality of discrete or differentiated matrixes or networks 934 of multiple second ribs. For example, each network 934 of second ribs 932 may include a subset of the total plurality of second ribs that are immediately adjacent to one another. Additionally, the second ribs 932 in each network 934 are at least partially extensive with one another. In the illustrated embodiment, because the lengths of the second ribs 932 vary, the networks 934 may take on varying shapes such as the diamond shape that is illustrated. Thus, the networks 934 may appear to be superimposed over the first ribs 930 on the sidewall.

The web 901 may engage nip rollers 972 which may pull on the web 901 and may cause the first ribs 930 to spread open or flatten. The nip rollers 972 may be located between rollers 931, 933 and rollers 935, 937. In another embodiment, the nip rollers 972 may be located after the rollers 935, 937.

Each of the first and second ribs 930, 932 may have a repeating but alternating V-shape, but in other embodiments the ribs may have other suitable shapes or forms. For example, the shape of the first and second ribs may be corrugated or sinusoidal in shape. As further described herein, the shape of the ribs may be imparted or impressed into the thin, planar web material that the bag sidewalls are made from. The first ribs 930 may have the same dimensional information as the ribs 130 in FIGS. 1-5. The second ribs 932 may have the same dimensional information as the ribs 132 in FIGS. 1-5.

Figure 20:
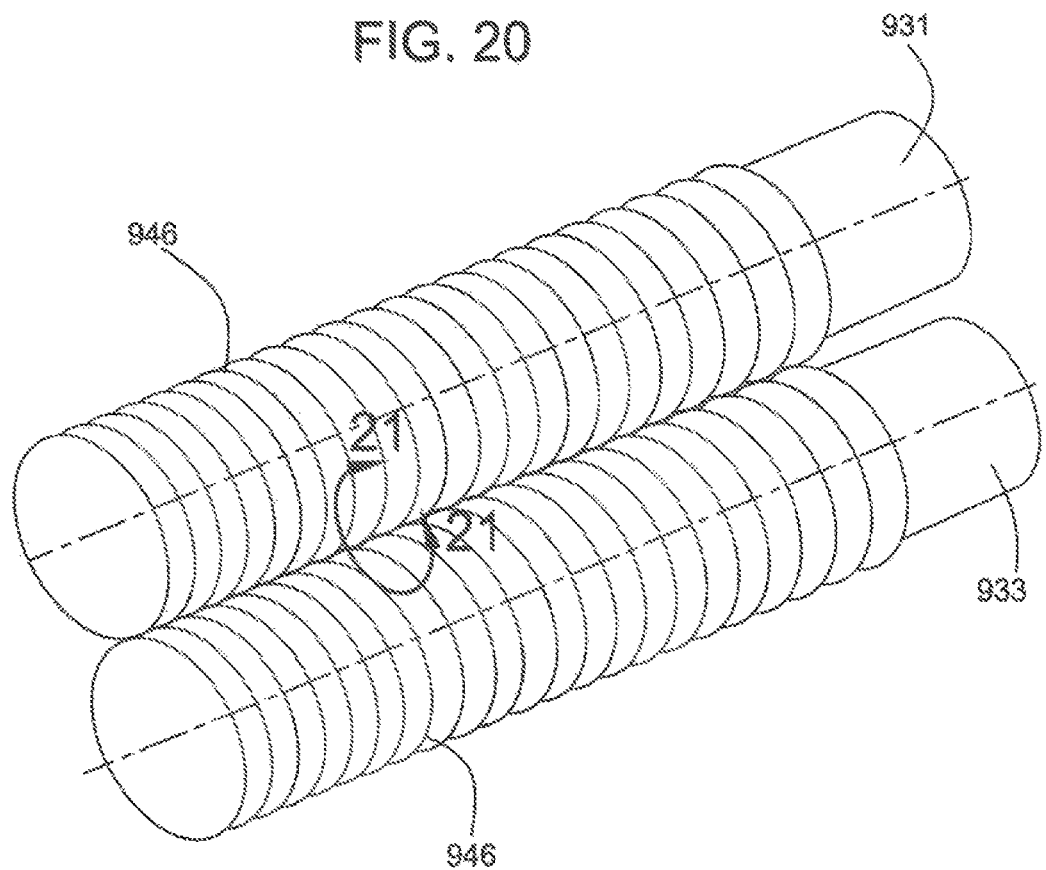
FIG. 20 is a perspective view of the rollers in FIG. 19.
Figure 21:
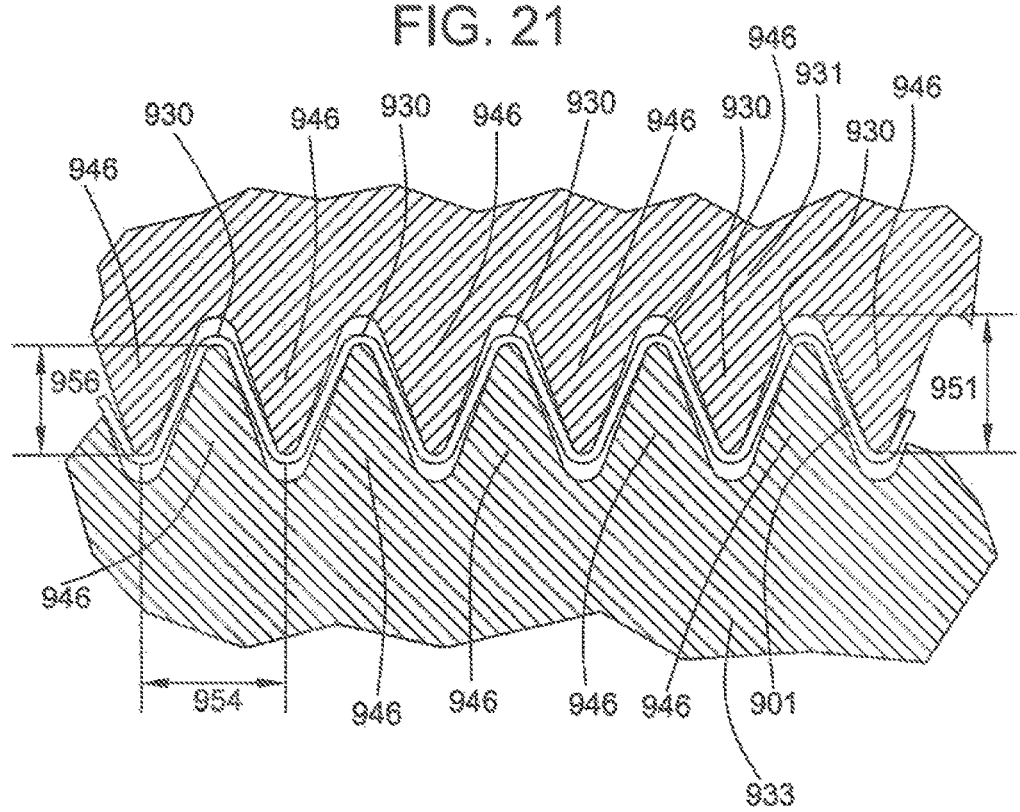
FIG. 21 is a cross-sectional view along circle 21-21 in FIG. 20.

Referring to FIG. 20, the rollers 931, 933 may be similar to rollers 230, 232 in FIGS. 6, and 8-9 except that the segments 252 on roller 230 may be replaced with segments 250. The rollers 931, 933 may have ridges 946. The ridges 946 may be similar to segments 250 in FIGS. 8 and 9. Referring to FIG. 21, the ridges 946 may have a peak height 951. The peak height 951 may have the same dimensional information as peak height 254 in FIG. 8. The ridges 946 may have a peak to peak spacing or pitch 954. The pitch 954 may have the same dimensional information as pitch 241 in FIG. 9. The ridges 946 may have a depth of engagement 956. The depth of engagement 956 may be the same as the depth of engagement 262 in FIG. 9.

Referring to FIG. 21, there is illustrated the interaction between the rotating first and second rollers 931, 933 as the web 901 is directed therebetween. To facilitate cooperation between the first and second rollers, the pattern of ridges 946 on the first roller 931 may be axially offset with respect to the pattern of ridges 946 on the second roller 933 so that the ridges of each roller can be received in and accommodated by the grooves formed between the ridges of the opposing roller. In the illustrated embodiment, the ridges 946 on the first roller 931 may have the same shape and size along the surface of the roller. In another embodiment, the ridges 946 on the first roller 931 may have shapes and sizes complementary or converse to that of the ridges 946 on the second roller 933. As the web 901 is directed between the rollers, the ridges 946 on the first roller 931 may force or displace the web material between the ridges 946 on the second roller 933. To facilitate displacement of the web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

As the web 901 is advanced between the rollers 931, 933 that may be rotating in opposite rotational directions, cooperation between the ridges 946 may deform the web into a corrugated or ribbed pattern conforming to the ridges 946, as illustrated in FIG. 21. The rollers 931, 933 may form the ribs 930.

Figure 22:
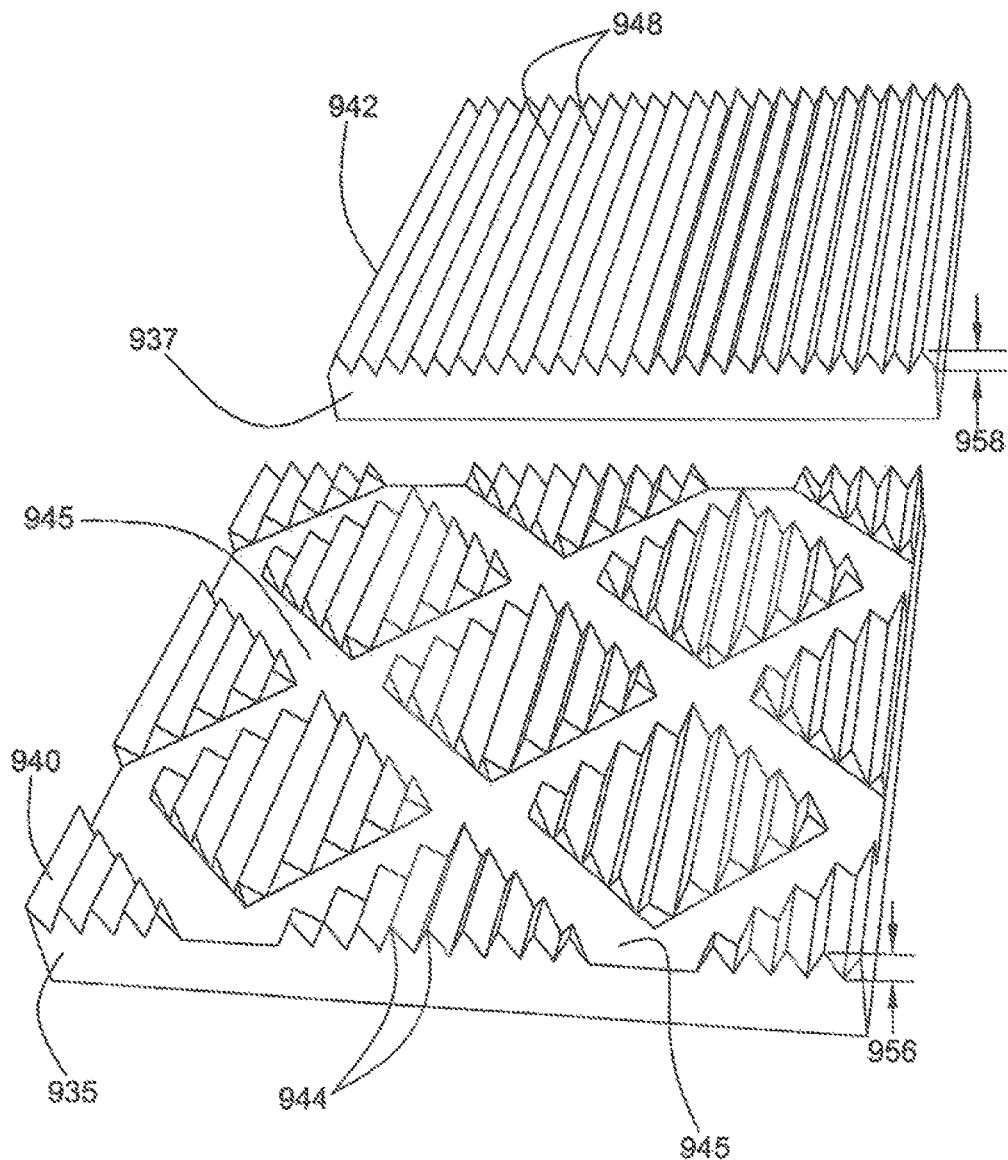
FIG. 22 is a perspective view of the surface of the rollers in FIG. 21.
Figure 23:
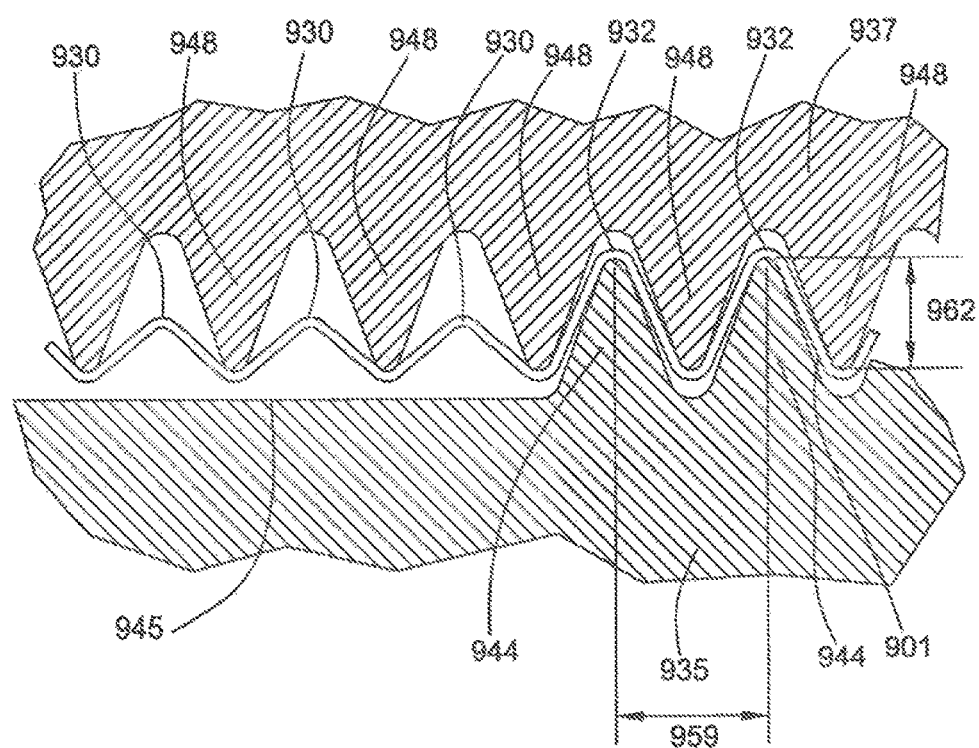
FIG. 23 is a cross-sectional view illustrating the interaction of the web and the ridges for the embodiment shown in FIG. 22.

Referring to FIGS. 22-23, the rollers 935, 937 may be similar to rollers 230, 232 in FIGS. 8 and 9 except that the segments 250 on the roller 230 may be replaced with lower areas 945 on roller 935. The lower areas 945 may be flat or non-ridged.

Referring to FIG. 22, there is illustrated the surface 940 of the first roller 935 and the surface 942 of the second roller 937. The first surface 940 may include a plurality of teeth or ridges 944 that protrude outward from the roller. Each of the ridges 944 may be parallel to each other and may extend radially about the surface of the roller. Multiple ridges may be spaced along the axial length of the roller. Formed on the surface 942 of the second roller may also be a plurality of parallel teeth or ridges 948 that extend about the circumference of the roller and may be spaced along the axial length of the second roller. The first and second ridges 944, 948 may cooperate when the rollers are placed adjacent to each other and rotated in opposite directions. Each of the ridges 944, 948 may be in the shape of an inverted V.

To provide for the different heights of the first and second ribs 930, 932, each ridge 944 on the first surface 940 may have a height 956. The height 956 may have the same dimensional information as height 256 in FIG. 8. The ridges 948 on the second surface 942 may have a height 958. The height 958 may have the same dimensional information as height 258 in FIG. 8. The ridges 944 may have a peak to peak spacing or pitch 959. The pitch 959 may have the same dimensional information as pitch 243 in FIG. 9. To form the desired shape on the cylindrical rollers, the rollers may be cast, ground or etched as appropriate.

Referring to FIG. 23, there is illustrated the interaction between the rotating first and second rollers 935, 937 as the web 901 is directed therebetween. The ridges 944 of the first roller 935 may protrude upwards a further distance than the area 945. To facilitate cooperation between the first and second rollers, the pattern of ridges 944 on the first roller 935 may be axially offset with respect to the pattern of ridges 948 on the second roller 937 so that the ridges of each roller can be received in and accommodated by the grooves formed between the ridges of the opposing roller. In the illustrated embodiment, the second ridges 948 may have the same shape and size along the surface of the roller. In another embodiment, the second ridges 948 may have shapes and sizes complementary or converse to that of the ridges 944. As the web 901 is directed between the rollers, the ridges 944 on the first roller 935 force or displace the web material between the ridges 948 on the second roller 937. To facilitate displacement of the web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

The area 945 on the first roller 935 and the second ridges 948 on the second roller 937 may not engage. The ridges 944 on the first roller 935 and the second ridges 948 on the second roller 937 have a depth of engagement 962. The depth of engagement 962 may have the same dimensional information as depth of engagement 262 in FIG. 9.

As the web 901 is advanced between the rollers 935, 937 that may be rotating in opposite rotational directions, cooperation between the ridges 944, 948 may deform the web into a corrugated or ribbed pattern conforming to the ridges 944, 948, as illustrated in FIG. 23. As the web 901 is advanced between areas 945 and ridges 948, the web 901 may not be deformed due to the lack of engagement between areas 945 and ridges 948. In this embodiment, the ribs 930 from the prior operation have not been spread open or flattened and the ridges 948 may be aligned with the valleys between the ribs 930. The ribs 930 may not be spread open or flattened because one or more of the nip rollers 972 may be removed or the web 901 may not engage the nip rollers 972. The interaction between the ridges 944 on the first roller 935 and the ridges 948 on the second roller 937 may stretch the web material out at that location a greater amount than the ribs 930 from the prior operation. The greater amount of stretching may result in the web maintaining a shape at that location corresponding to the protruding ridges 944 on the roller 935. Thus, after the web has been processed, the second ribs 932 may retain the alternating V- or U-shape corresponding to the ridges. That shape may unbend or flatten out to expand the bag as described herein. Because the second ribs 932 retain their shape after being stretched by interacting ridges 944, 948, they may not substantially add to the increased width of the web. However, the nip rollers 972 may be positioned after rollers 935, 937 in order to spread open or flatten the ribs 930 and thus increase the width of the web 901.

Figure 24:
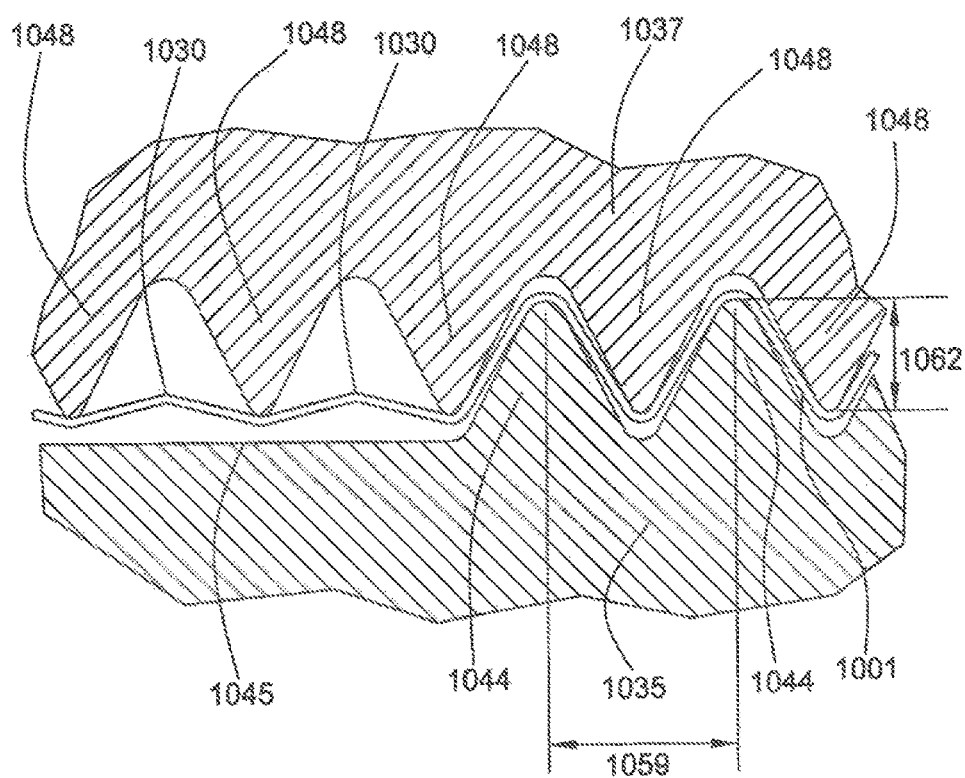
FIG. 24 is a cross-sectional view illustrating the interaction of the web and the ridges for another embodiment.

Referring to FIG. 24, there is illustrated another embodiment of the operation and the rollers. The rollers 1035, 1037 may be similar to rollers 935, 937 except that the spacing of the ridges 1048 is adjusted to accommodate the spread open or flattened ribs 1030. In this embodiment, the web 1001 has been pulled prior to engaging rollers 1035, 1037 so that the ribs 1030 are spread open or flattened as shown in FIG. 24. The web 1001 may be pulled by nip rollers 972. As the web 1001 is advanced between areas 1045 and ridges 1048, the web 1001 may not be deformed due to the lack of engagement between areas 1045 and ridges 1048. In this embodiment, the ridges 1048 opposite area 1045 may be aligned with the valleys between the ribs 1030. The ridges 1044, 1048 may deform the web 1001 similar to the ridges 944, 948 in FIG. 23. The ridges 1044 may have a peak to peak spacing or pitch 1059. The pitch 1059 may have a first range from about 0.02 inches (0.05 cm) to about 0.20 inches (0.51 cm), a second range from about 0.03 inches (0.076 cm) to about 0.10 inches (0.25 cm), and a third range from about 0.035 inches (0.089 cm) to about 0.075 inches (0.191 cm). In one embodiment, the pitch 159 may be about 0.04 inches (0.102 cm). The ridges 1044 may have a depth of engagement 1062 with ridges 1048. The depth of engagement 1062 may have the same dimensional information as depth of engagement 262 in FIG. 9.

Figure 25:
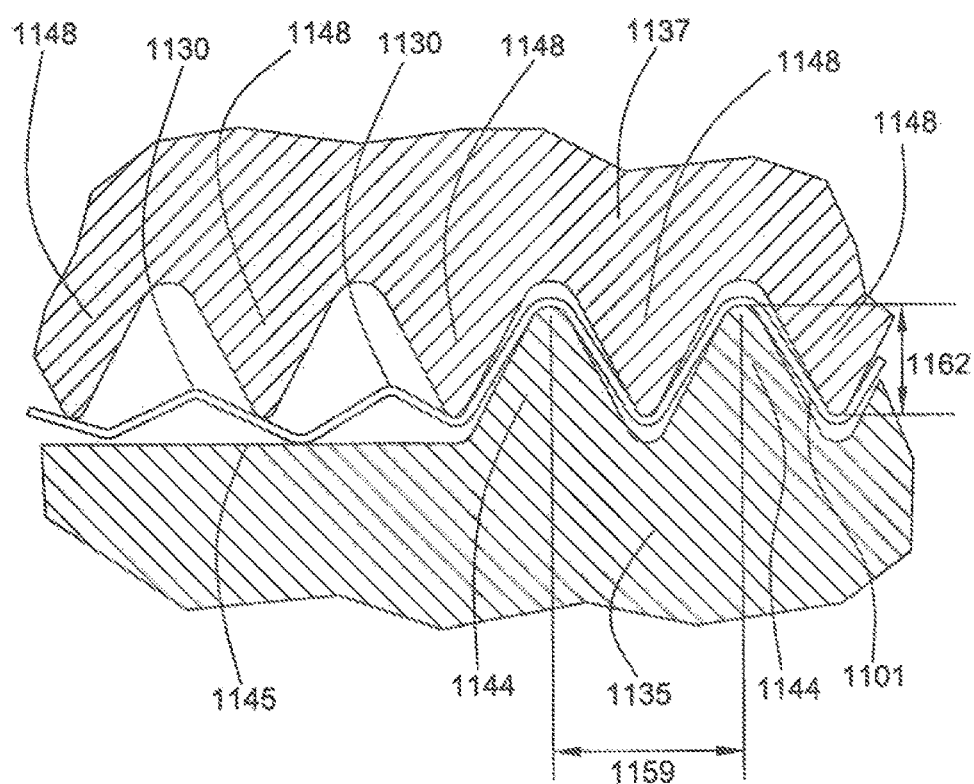
FIG. 25 cross-sectional view illustrating the interaction of the web and the ridges for another embodiment.

Referring to FIG. 25, there is illustrated another embodiment of the operation and the rollers. The rollers 1135, 1137 may be similar to rollers 1035, 1037. In this embodiment, the web 1101 has been pulled prior to engaging the rollers 1135, 1137 so that the ribs 1130 are spread open or flattened as shown in FIG. 25. The web 1101 may be pulled by nip rollers 972. As the web 1101 is advanced between areas 1145 and ridges 1148, the web 1101 may not be deformed due to the lack of engagement between areas 1145 and ridges 1148. In this embodiment, the ridges 1148 may not be aligned with the valleys between the ribs 1130. The ridges 1144, 1148 may deform the web 1101 similar to the ridges 944, 948 in FIG. 23. The ridges 1144 may have a peak to peak spacing or pitch 1159. The pitch 1159 may have a first range from about 0.02 inches (0.05 cm) to about 0.20 inches (0.51 cm), a second range from about 0.03 inches (0.076 cm) to about 0.10 inches (0.25 cm), and a third range from about 0.035 inches (0.089 cm) to about 0.075 inches (0.191 cm). In one embodiment, the pitch 159 may be about 0.04 inches (0.102 cm). The ridges 1144 may have a depth of engagement 1162 with ridges 1148. The depth of engagement 1162 may have the same dimensional information as depth of engagement 262 in FIG. 9.

Figure 26:
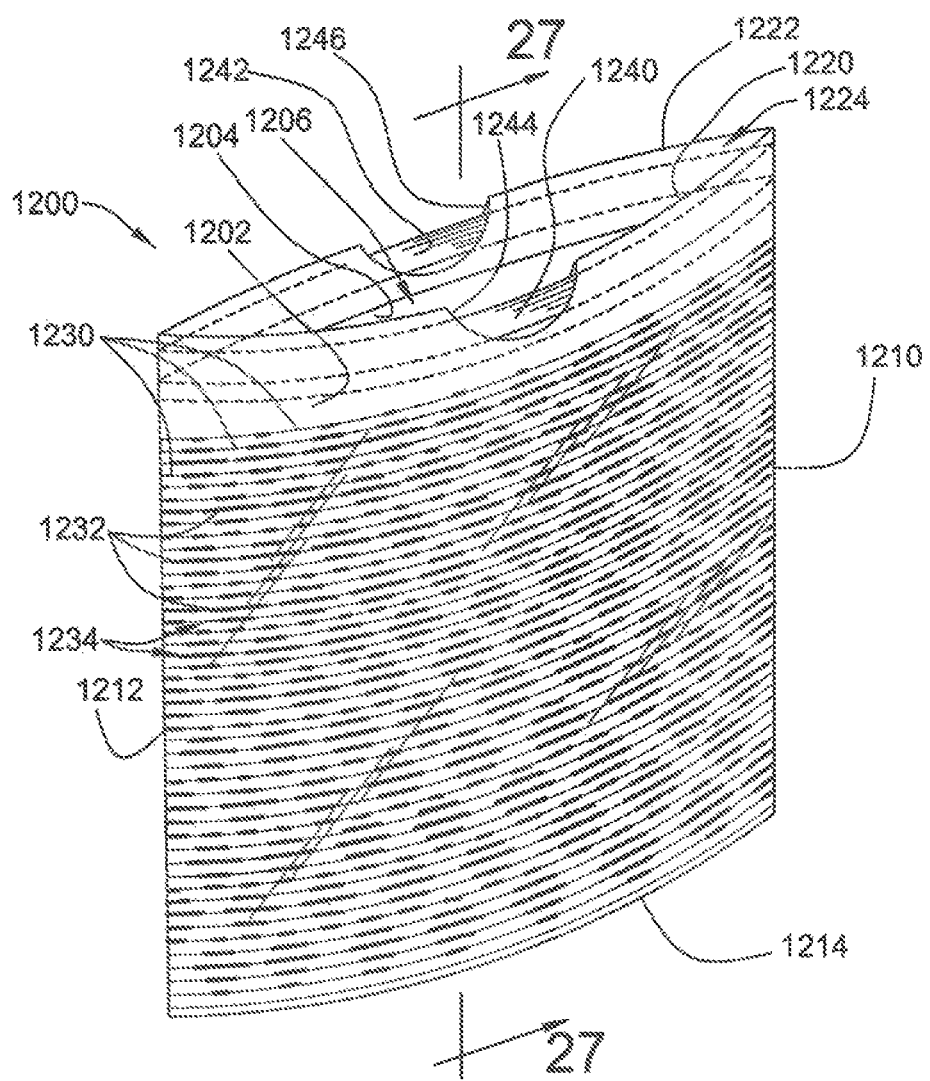
FIG. 26 is a perspective view of another embodiment of a thermoplastic bag having a plurality of first ribs and a plurality of second ribs formed into the sidewall and a draw tape for closing the opening.
Figure 27:
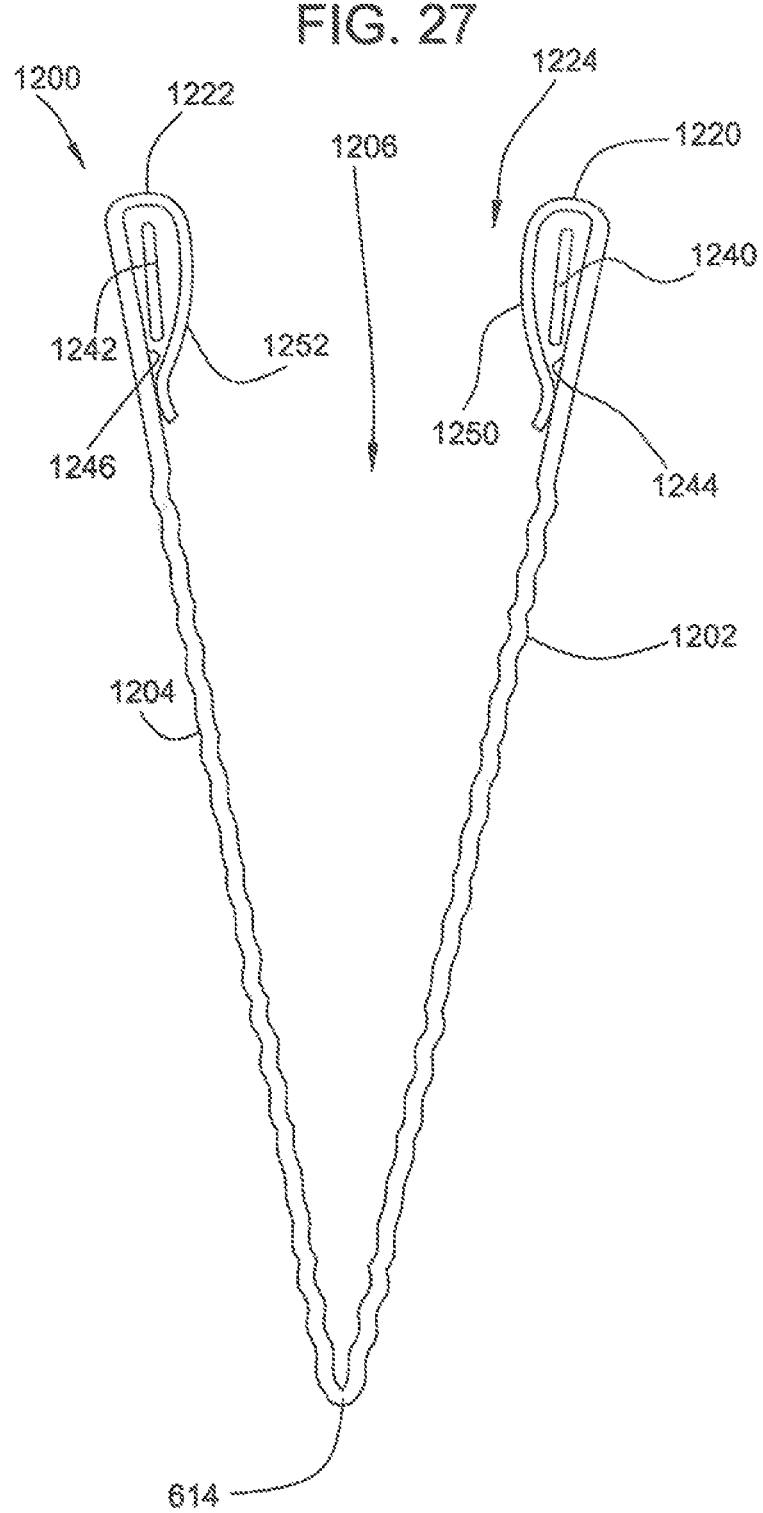
FIG. 27 is a cross-sectional view taken along line 27-27 of FIG. 26 illustrating the draw tape accommodated in hems formed along the top edges of the sidewalls.

Referring to FIG. 26, there is illustrated another embodiment of a thermoplastic bag 1200 that may be formed with first and second ribs of differing sizes. The bag 1200 may be similar to bag 100 in FIG. 1 except that the bag 1200 may include draw tapes 1240, 1242. The bag 1200 may include opposing first and second sidewalls 1202, 1204 of pliable thermoplastic material that overlay and may be joined to each other along a first side edge 1210, a second side edge 1212 and a bottom edge 1214 that extends between the first and second side edges. Between the first and second sidewalls 1202, 1204 is an interior volume 1206 that may be accessed by an opening 1224 delineated by the un-joined first and second top edges 1220, 1222 of the sidewalls. To close the opening 1224, first and second draw tapes 1240, 1242 may be accommodated in respective first and second hems 1244, 1246 formed along the un-joined top edges 1220, 1222 of the bag. Referring to FIG. 27, the first hem 1244 may be formed by folding a hem flap 1250 into the interior volume and sealing the flap to the interior surface of the first sidewall 1202 to provide a channel in which the draw tape 1240 may be accommodated. Likewise, the second hem 1246 may be formed by folding a second hem flap 1252 back into the interior volume and sealing it to the second sidewall 1204. In another embodiment, the hem flaps may be formed by folding the hem flap to the exterior of the sidewall and attaching the hem flap to the exterior of the sidewall.

Referring to FIG. 26, the first sidewall 1202 may have a plurality of first ribs 1230 and a corresponding plurality of second ribs 1232. The first ribs 1230 may extend across the width of the bag 1200 from the first side edge 1210 to the second side edge 1212 and may be parallel with one another. The ribs 1230 may be parallel with the unsealed top edges 1220, 1222 and the bottom edge 1214. The second ribs 1232 may be substantially shorter in length than the first ribs 1230. The second ribs 1232 may be aligned with the first ribs. Thus, the second ribs 1232 may be parallel with each other. Further, the second ribs 1232 may be arranged into networks 1234 or matrixes. The networks 1234 may be diamond-shaped and adjacent ribs 1232 of varying lengths may be partially extensive with one other.

As described herein, the depth or dimension of the second ribs 1232 may be greater than that of the first ribs 1230 due to the forming process. Moreover, the second ribs 1232 may retain or keep their shape after formation. Thus, when a pulling or tensioning force is applied to the thermoplastic sidewall, the second ribs 1232 may unbend or flatten out to provide the sidewall with an elastic or expandable characteristic. The process of forming the first ribs 1230 may increase the surface area of web material available for manufacturing the bags.

Figure 28:
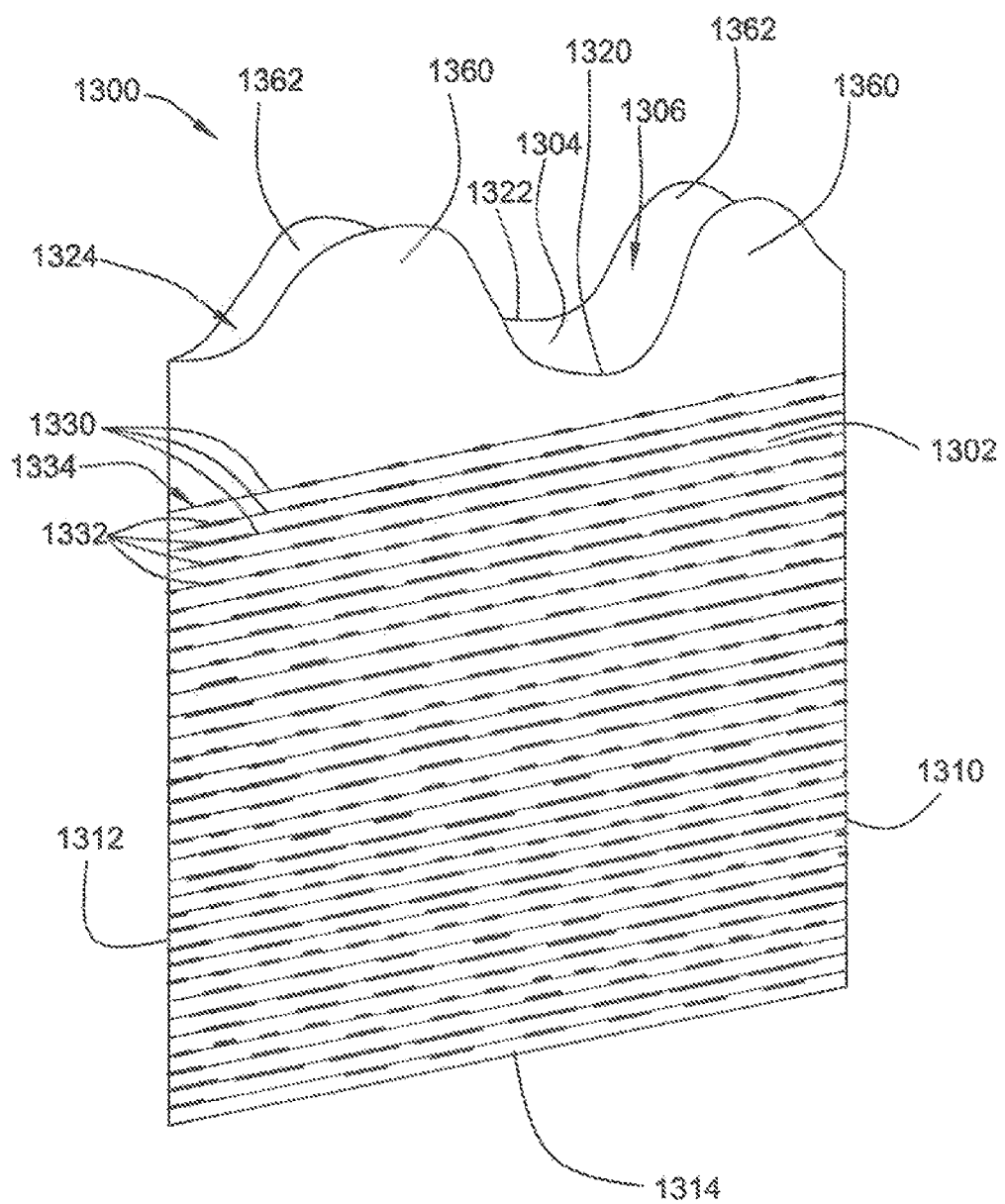
FIG. 28 is a perspective view of another embodiment of a thermoplastic bag having a plurality of first ribs and a plurality of second ribs formed into the sidewall and provided with tie flaps for tying closed the opening.

Referring to FIG. 28, there is illustrated another embodiment of a bag 1300 which is formed with first and second ribs of differing size and structure. The bag 1300 may be similar to bag 100 in FIG. 1 except that the bag 1300 may include tie flaps 1360, 1362. The bag 1300 may include first and second opposing sidewalls 1302, 1304 of thermoplastic material overlaid and joined along a first side edge 1310, a second side edge 1312, and a bottom edge 1314 that extends between the first and second side edges to provide an interior volume 1306. To access the interior volume 1306, the top edge 1320 of the first sidewall 1302 and the adjacent top edge 1322 of the second sidewall 1304 remain un-joined to delineate an opening 1324. To close the opening 1324, the bag 1300 may be provided with tie flaps 1360, 1362 that may extend as part of the top edges 1320, 1322 of the respective sidewalls 1302, 1304. The tie flaps 1360, 1362 may be tied together when the bag 1300 is removed from the receptacle. In addition to the tie flaps and draw tapes, other suitable closing mechanisms may include twist ties and mechanical clips.

As illustrated, the first sidewall 1302 may have formed therein a plurality of first ribs 1330 and a plurality of second ribs 1332. The second ribs 1332 may be shorter in length but larger in depth than the first ribs 1330. The second ribs 1332 may retain their folded or bunched together shape and may be arranged in networks 1334 consisting of parallel, partially extensive second ribs 1332. When the sidewall is placed under an applied force, the second ribs 1332 may unbend or flatten out to expand the size or volume of the bag.

Figure 29:
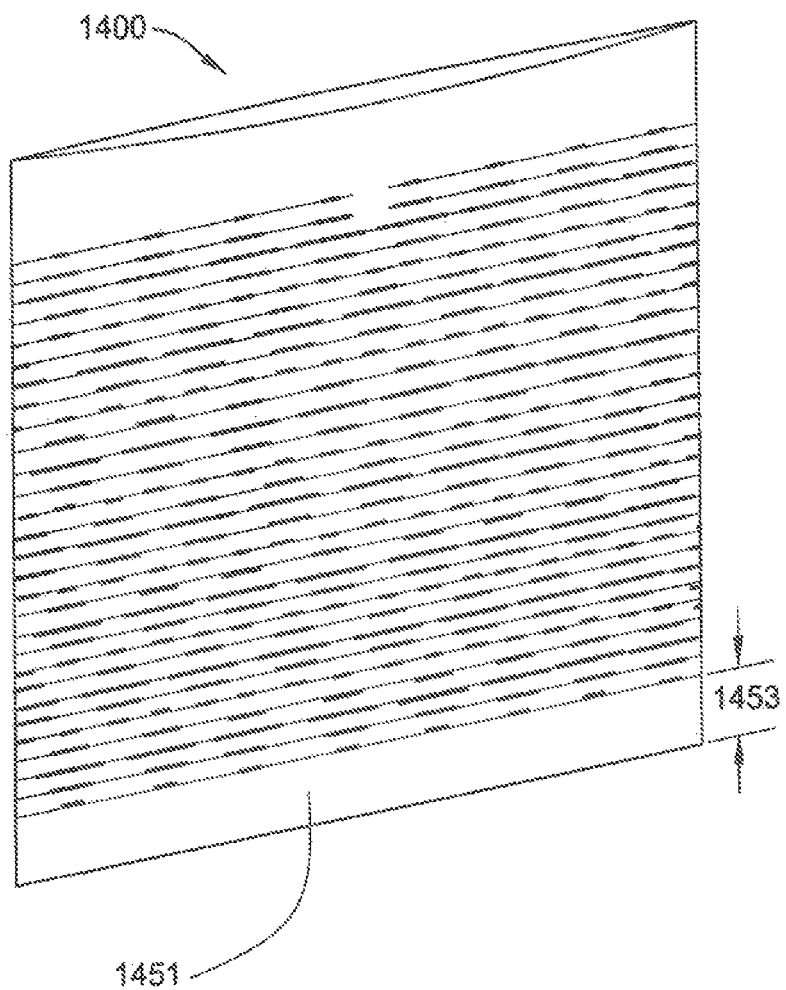
FIG. 29 is a perspective view of another embodiment.
Figure 30:
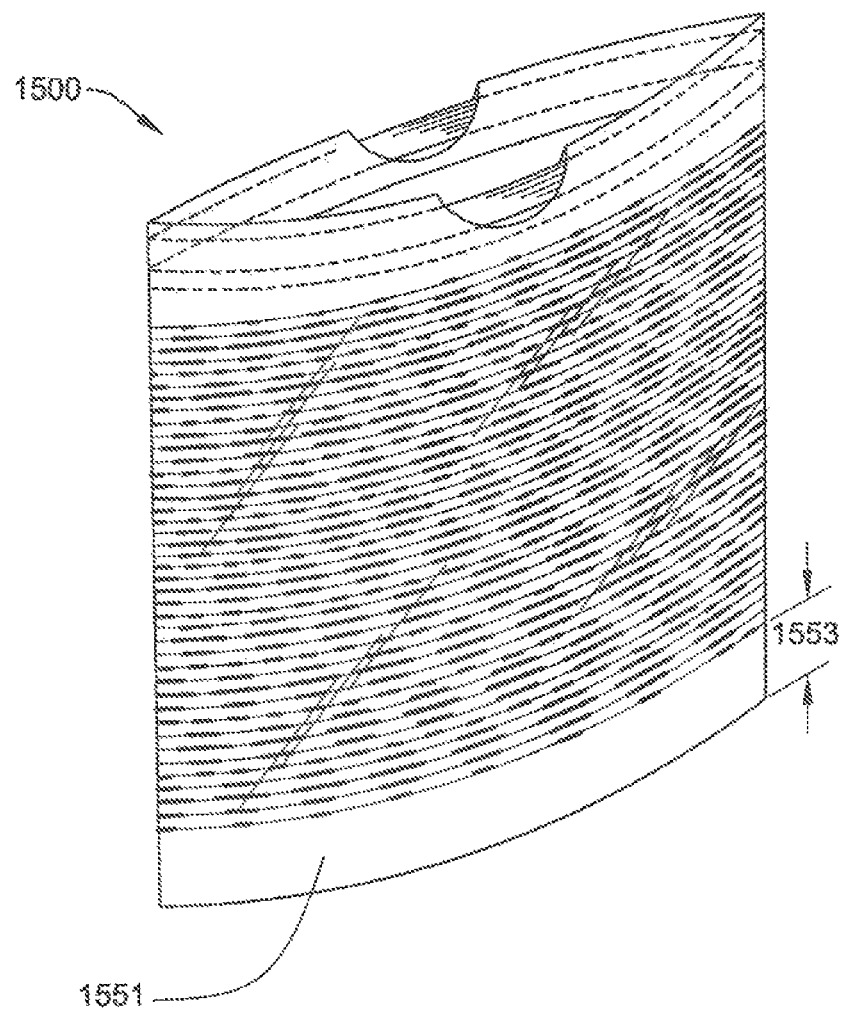
FIG. 30 is a perspective view of another embodiment.

In other embodiments, the web may be processed so that the pattern may be located in one or more portions of the bag and the non-patterned thicker material may be directed to other portions of the finished bag, such as the bottom portion shown in FIGS. 29, 30 and/or 31, that may otherwise be susceptible to rupture and/or puncture. FIG. 29 illustrates another embodiment of a bag. The bag 1400 may be similar to bag 100 in FIG. 1 except that the bottom portion 1451 may not have the ribs. The height 1453 of this unprocessed bottom portion 1451 may have any suitable dimensions with consideration to the web size. The height 1453 may have a first range from about 3 inches (7.62 cm) to 9 inches (22.86 cm), a second range from about 4 inches (10.16 cm) to 8 inches (20.32 cm), and a third range from about 5 inches (12.70 cm) to 7 inches (17.78 cm). In one embodiment, the height 1453 may be about 6 inches (15.24 cm).

FIG. 30 illustrates another embodiment of a bag. The bag 1500 may be similar to bag 1200 in FIG. 26 except that the bottom portion 1551 may not have the ribs. The height 1553 of the bottom portion 1551 may have the dimensions as noted herein, such as, height 1453 in FIG. 29.

Figure 31:
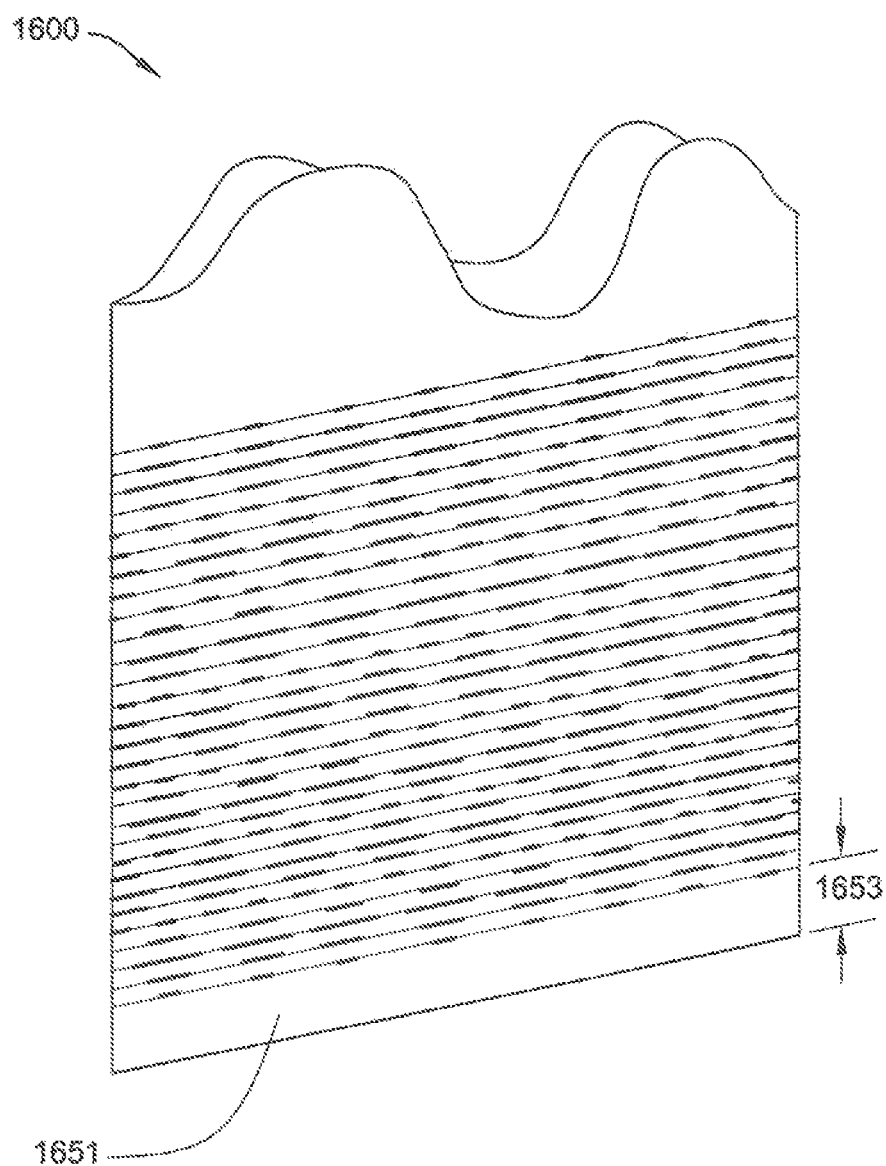
FIG. 31 is a perspective view of another embodiment.

FIG. 31 illustrates another embodiment of a bag. The bag 1600 may be similar to bag 1300 in FIG. 28 except that the bottom portion 1651 may not have the ribs. The height 1653 of the bottom portion 1651 may have the same dimensions as noted herein, such as, height 1453 in FIG. 29.

EXPERIMENTAL

The Overlapping SELFing/Ring Rolling pattern of the invention at several DOE, or depth of engagement, gave better stretching or LFE than SELFing alone. Low Force Extension (LFE) is a measure of the stretch in the bag that the consumer will experience during use. Ring Rolling by itself provides minimal stretching or LFE. Additionally, the Overlapping SELFing/Ring Rolling pattern provides for film growth for a substantial cost savings while maintaining physical properties important for the bag. The Overlapping SELFing/Ring Rolling pattern has a seven rib diamond SELFing pattern, similar to the nine rib diamond pattern of FIG. 8, with a Ring Rolling pattern ribs in between and of lower height. The difference in height between the Ring Rolling and SELFing ribs is 0.018". The SELFing pattern has a seven rib diamond SELFing pattern, similar to the SELFing in the nine rib diamond pattern of FIG. 8, showing an Overlapping SELFing/RingRolling pattern.

The Overlapping SELFing/Ring Rolling pattern has substantial growth while limiting the loss in film thickness. In comparison, the Modified Pattern contains "stripes" of Ring-Roll and "stripes" of SELFing running parallel to the machine direction of the bag. The Modified Pattern has 4 rows of teeth SELF or RingRoll in each "stripe". Therefore 50% of the pattern is responsible for the growth and 50% of pattern is responsible for the stretch. Because the Overlapping SELFing/RingRolling pattern has elements of SELFing and elements of RingRolling in each tooth, 100% of the pattern is responsible for growth and 100% of the pattern is responsible for stretch. That allows the growth to be spread over a larger area of the pattern meaning that the overall growth of the bag results in less thinning of the web with the overlapping pattern. At the same overall bag growth, the average thickness of the bag is the same. The reduction in thickness is more concentrated in the Modified SELF and RingRolling pattern. The Modified pattern can achieve greater growth, but with a greater lose of thickness, with may lead to less optimal physical properties. The Overlapping SELFing/Ring Rolling pattern additionally can achieve less light transmission than the Modified Pattern so that the Overlapping SELFing/Ring Rolling pattern may appear the more opaque than the Modified Pattern.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of forming a thermoplastic web comprising: providing first and second rollers, the rollers arranged adjacent to each other, a surface of the first roller including a plurality of ridges protruding radially outward, the ridges of the first roller arranged parallel to and axially spaced from one another, the ridges of the first roller having first segments of a first height and second segments of a second height, the second height being greater than the first height;

providing a web of pliable thermoplastic material, the web having an initial width between a first edge and a second edge;

rotating the first and second rollers in opposite rotational directions;

advancing the web along a machine direction between the first and second rollers;

plastically stretching first portions of the web with the first segments so that the initial width of the web increases; and stretching second portions of the web with the second segments so that the stretched second portions of the web are displaced with respect to an initial plane of the web without increasing the initial width of the web.

2. The method of claim 1, wherein plastically stretching the first portions of the web molecularly re-orientates the thermoplastic material of the plastically stretched first portions of the web.

3. The method of claim 2, wherein the plastically stretched first portions of the web form a plurality of first ribs parallel to the machine direction.

4. The method of claim 3, wherein the first ribs have a first rib height and the stretched second portions have a second rib height greater than the first rib height.

5. The method of claim 4, wherein the stretched second portions of the web are arranged in differentiated networks of adjacent second ribs.

6. The method of claim 5, wherein the first ribs have a first length, and the second ribs have lengths that differ from the first length.

7. The method of claim 6, wherein each differentiated network includes adjacent second ribs partially extensive with one another.

8. The method of claim 7, wherein the lengths of the second ribs vary.

9. The method of claim 8, wherein each differentiated network is diamond shaped.

10. The method of claim 5, wherein plastically stretching the first portions of the web with the first segments and stretching the second portions of the web with the second segments comprises forming a continuous ribbed structure across the web that alternates repeatedly between first ribs and second ribs.

11. The method of claim 10, wherein plastically stretching the first portions of the web and stretching the second portions of the web comprises forming first ribs and the second ribs such that the first and second ribs are aligned in the machine direction and a direction transverse to the machine direction.

12. The method of claim 1, further comprising forming the thermoplastic web into a bag.

13. The method of claim 1, wherein plastically stretching the first portions of the web with the first comprises engaging the web against flat surfaces of the first segments.

14. The method of claim 13, wherein stretching the second portions of the web with the second segments comprises engaging the web against rounded surfaces of the second segments.

15. The method of claim 1, wherein the first segments have a first shape and the second segments have a second shape differing from the first shape.

16. A method of forming a thermoplastic bag comprising:
providing first and second rollers, the rollers arranged adjacent to each other, a surface of the first roller including a plurality of ridges protruding radially outward, the ridges of the first roller arranged parallel to and axially spaced from one another, the ridges of the first roller having first segments of a first height and second segments of a second height, the second height being greater than the first height;

providing a web of pliable thermoplastic material, the web having an initial width between a first edge and a second edge;

rotating the first and second rollers in opposite rotational directions;

advancing the web along a machine direction between the first and second rollers;

plastically stretching first portions of the web with the first segments so that the initial width of the web increases;

stretching second portions of the web with the second segments so that the stretched second portions of the web are displaced with respect to an initial plane of the web without increasing the initial width of the web;

heat sealing folded portions of the web together to form side edges; and perforating heat-sealed potions of the web to separate the thermoplastic bag from the web.

17. The method of claim 16, wherein second portions of the web have structural elastic like film properties, and wherein the first portions of the web are devoid of structural elastic like film properties.

18. The method of claim 17, wherein the first portions of the web stretch under tension and the second portions of the web unbend under tension.

19. The method of claim 16, wherein plastically stretching the first portions of the web and stretching the second portions of the web with the second segments comprises forming a continuous ribbed structure across the web.

20. The method of claim 16, wherein:
plastically stretching the first portions of the web with the first segments comprises engaging the web against flat surfaces of the first segments; and
stretching the second portions of the web with the second segments comprises engaging the web against rounded surfaces of the second segments.

* * * * *